(12) United States Patent
Urmson et al.

(10) Patent No.: US 9,110,196 B2
(45) Date of Patent: *Aug. 18, 2015

(54) DETECTING ROAD WEATHER CONDITIONS

(71) Applicant: Google Inc., Mountain View, CA (US)

(72) Inventors: Christopher Paul Urmson, Mountain View, CA (US); Michael Steven Montemerlo, Mountain View, CA (US); Jiajun Zhu, Sunnyvale, CA (US)

(73) Assignee: Google, Inc., Mountain View, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/623,397

(22) Filed: Sep. 20, 2012

(65) Prior Publication Data

US 2014/0081573 A1 Mar. 20, 2014

(51) Int. Cl.
*G01W 1/00* (2006.01)
*G01W 1/02* (2006.01)
*G01W 1/10* (2006.01)
*G01S 17/89* (2006.01)

(52) U.S. Cl.
CPC .................. *G01W 1/02* (2013.01); *G01S 17/89* (2013.01); *G01W 1/10* (2013.01)

(58) Field of Classification Search
None
See application file for complete search history.

(56) References Cited

U.S. PATENT DOCUMENTS

| | | | |
|---|---|---|---|
| 5,521,594 A | 5/1996 | Fukushima | |
| 5,699,056 A * | 12/1997 | Yoshida | 340/905 |
| 5,736,957 A | 4/1998 | Raney | |
| 5,991,460 A * | 11/1999 | Mitchell | 382/278 |
| 6,370,475 B1 | 4/2002 | Breed et al. | |
| 6,405,132 B1 | 6/2002 | Breed et al. | |
| 6,526,352 B1 | 2/2003 | Breed et al. | |

(Continued)

FOREIGN PATENT DOCUMENTS

| | | |
|---|---|---|
| DE | 10 2007 053 721 A | 5/2009 |
| JP | 2004274431 A | 9/2004 |

(Continued)

OTHER PUBLICATIONS

International Search Report and Written Opinion for Application No. PCT/US2013/060552 dated Dec. 20, 2013.

(Continued)

*Primary Examiner* — Sujoy Kundu
*Assistant Examiner* — Paul D Lee
(74) *Attorney, Agent, or Firm* — Lerner, David, Littenberg, Krumholz & Mentlik, LLP

(57) ABSTRACT

Aspects of the disclosure relate generally to detecting road weather conditions. Vehicle sensors including a laser, precipitation sensors, and/or camera may be used to detect information such as the brightness of the road, variations in the brightness of the road, brightness of the world, current precipitation, as well as the detected height of the road. Information received from other sources such as networked based weather information (forecasts, radar, precipitation reports, etc.) may also be considered. The combination of the received and detected information may be used to estimate the probability of precipitation such as water, snow or ice in the roadway. This information may then be used to maneuver an autonomous vehicle (for steering, accelerating, or braking) or identify dangerous situations.

22 Claims, 25 Drawing Sheets

(56) References Cited

U.S. PATENT DOCUMENTS

| | | | |
|---|---|---|---|
| 6,606,035 B2 | 8/2003 | Kapadia et al. | |
| 6,768,944 B2 | 7/2004 | Breed et al. | |
| 6,817,740 B2 | 11/2004 | Kobayashi et al. | |
| 7,085,637 B2 | 8/2006 | Breed et al. | |
| 7,184,889 B2 | 2/2007 | Isaji et al. | |
| 7,202,776 B2 | 4/2007 | Breed | |
| 7,271,880 B2 | 9/2007 | Samukawa et al. | |
| 7,272,474 B1 | 9/2007 | Stentz et al. | |
| 7,317,987 B2 | 1/2008 | Nahla | |
| 7,493,202 B2 | 2/2009 | Demro et al. | |
| 7,668,369 B2 | 2/2010 | Yen et al. | |
| 7,765,050 B2 | 7/2010 | Hrovat et al. | |
| 7,793,230 B2 | 9/2010 | Burns et al. | |
| 8,306,672 B2 | 11/2012 | Nickolaou | |
| 8,421,859 B2 | 4/2013 | Zhang et al. | |
| 8,436,902 B2 | 5/2013 | Kuehnle | |
| 8,473,143 B2 | 6/2013 | Stark et al. | |
| 8,473,144 B1 | 6/2013 | Dolgov et al. | |
| 2004/0107042 A1 | 6/2004 | Seick | |
| 2004/0138831 A1 | 7/2004 | Watanabe et al. | |
| 2005/0143889 A1 | 6/2005 | Isaji et al. | |
| 2007/0049260 A1* | 3/2007 | Yuhara et al. | 455/414.3 |
| 2008/0129541 A1 | 6/2008 | Lu et al. | |
| 2008/0239076 A1 | 10/2008 | Luo | |
| 2010/0100360 A1* | 4/2010 | Deng et al. | 703/2 |
| 2010/0114416 A1 | 5/2010 | Au et al. | |
| 2010/0217529 A1 | 8/2010 | Stroila et al. | |
| 2011/0071761 A1 | 3/2011 | Cummings | |
| 2011/0074955 A1 | 3/2011 | Kuehnle | |
| 2011/0126617 A1 | 6/2011 | Bengoechea Apezteguia et al. | |
| 2012/0069181 A1 | 3/2012 | Xue et al. | |
| 2012/0081544 A1 | 4/2012 | Wee | |
| 2012/0083982 A1 | 4/2012 | Bonefas et al. | |
| 2012/0140039 A1 | 6/2012 | Ota et al. | |
| 2012/0158207 A1* | 6/2012 | MacNeille et al. | 701/1 |
| 2012/0203428 A1 | 8/2012 | Choi et al. | |
| 2013/0127642 A1 | 5/2013 | Maggiore et al. | |

FOREIGN PATENT DOCUMENTS

| | | |
|---|---|---|
| JP | 2006308514 A | 11/2006 |
| JP | 2011-2420 | 1/2011 |
| KR | 20050101726 A | 10/2005 |

OTHER PUBLICATIONS

"New Sensor Fusion Approach Recognizes Rain, Snow and Ice on the Road" [online], Continental Globe Site, conti-online.com/generator/www/com/en/continental/.../pr_2010_10_12_sensorfusion_en.html, Oct. 12, 2010, 3 pages.

Banninger et al., "Reflectance Modeling for Real Snow Structures Using a Beam Tracing Model," Sensors 2008, May 26, 2008, pp. 3482-3496.

K. Antilla, et al., "Radiometric Calibration of TLS Intensity: Application to Snow Cover Change Detection," International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada, pp. 175-179.

* cited by examiner

DETECTING ROAD WEATHER CONDITIONS

CROSS-REFERENCE TO RELATED APPLICATIONS

This application is related to co-pending U.S. patent application Ser. No. 13/623,422, entitled "DETECTING ROAD WEATHER CONDITIONS," filed concurrently herewith, the entire disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). This detection and identification is a critical function for the safe operation of autonomous vehicle.

BRIEF SUMMARY

One aspect of the disclosure provides a method. The method includes receiving laser data collected for a roadway as a vehicle is driven along the roadway, wherein the laser data includes a plurality of laser data points, each data point of the plurality of laser data points having location and intensity information associated therewith; determining an average intensity of the plurality laser data points associated with locations within the roadway; comparing the average intensity to a threshold value associated with an expected average intensity of the roadway under dry weather conditions; when the average intensity is below the threshold value, identifying an indication that the roadway is wet; estimating, by a processor, a driving condition of the roadway based on the indication the roadway is wet; and using the estimate, by the processor, to make a driving decision for the vehicle.

In one example, the expected average intensity of the roadway under dry weather conditions is based on a composition of the surface of the roadway. In another example, the method also includes determining a distribution of intensity values for the roadway; comparing the determined distribution to an expected distribution for dry conditions; when the determined distribution is shifted towards a darker end of an intensity scale relative to the expected distribution for dry conditions, identifying a second indication that the roadway is wet; and wherein the second indication that the roadway is wet is used by the processor to estimate the driving conditions. In another example, the method also includes detecting a cloud of laser data points of the plurality of laser data points which do not indicate a particular structure located proximate to a rear portion of the vehicle; when the cloud is detected, identifying a second indication that the roadway is wet; and the second indication that the roadway is wet is used by the processor to estimate the driving conditions. In another example, the method also includes detecting a moving object in the roadway from the plurality of laser data points; detecting a cloud of laser data points of the plurality of laser data points which do not indicate a particular structure located proximate to the moving object; when the cloud is detected, identifying a second indication that the roadway is wet; and the second indication that the roadway is wet is used by the processor to estimate the driving conditions. In another example, the method also includes accessing detailed map information for the roadway indicating an expected elevation of the roadway; identifying a clouds of laser data points from the received laser data points associated with location data proximate to an expected surface of the roadway; comparing the laser data points of the cloud to a first threshold value above the expected roadway surface and a second threshold value below the expected roadway surface; when the laser data points of the cloud include at least one laser data point above the first threshold value and at least one laser data point below the second threshold value, identifying a second indication that the roadway is wet; and the second indication that the roadway is wet is used by the processor to estimate the driving conditions. In another example, the method also includes receiving images captured from a camera as the vehicle is driven along the roadway; identifying an additional indication that the roadway is wet conditions based on the images; and the additional indication that the roadway is wet is used by the processor to estimate the driving conditions. In another example, the method also includes receiving precipitation data from a precipitation sensor associated with the vehicle; identifying a second indication that the roadway is wet based on the precipitation data; and the second indication that the roadway is wet is used by the processor to estimate the driving condition. In another example, estimating the driving condition includes using a Bayesian estimate. In another example, the method also includes accessing detailed map information for the roadway indicating an expected elevation of the roadway; determining an average elevation for a portion of the roadway; identifying a second indication that the roadway is wet based on whether the average elevation of the portion of the roadway is at least a second threshold value greater than the expected elevation; and the second indication that the roadway is wet is used by the processor to estimate the driving condition. In another example, the method also includes receiving weather information for a current location of the vehicle from a server over a network; identifying a second indication that the roadway is wet based on the weather related information; the second indication that the roadway is wet is used by the processor to estimate the driving condition.

Another aspect of the disclosure provides a system. The system includes memory storing an expected average intensity of the roadway under dry weather conditions and a processor. The processor is configured to receive laser data collected for a roadway as a vehicle is driven along the roadway, wherein the laser data includes a plurality of laser data points, each data point of the plurality of laser data points having location and intensity information associated therewith; determine an average intensity of the plurality laser data points associated with locations within the roadway; compare the average intensity to a threshold value associated with the expected average intensity of the roadway under dry weather conditions; when the average intensity is below the threshold value, identify an indication that the roadway is wet; estimate a driving condition of the roadway based on the indication the roadway is wet; and using the estimate to make a driving decision for the vehicle.

In one example, the expected average intensity of the roadway under dry weather conditions is based on a composition of the surface of the roadway. In another example, the processor is also configured to determine a distribution of intensity values for the roadway; compare the determined distribution to an expected distribution for dry conditions; when the determined distribution is shifted towards a darker end of an intensity scale relative to the expected distribution for dry conditions, identify a second indication that the roadway is wet; and the second indication that the roadway is wet is used by the processor to estimate the driving conditions. In another example, the processor is also configured to detect a cloud of laser data points of the plurality of laser data points which do not indicate a particular structure located proximate to a rear portion of the vehicle; when the cloud is detected, identify a second indication that the roadway is wet; and the second indication that the roadway is wet is used by the processor to estimate the driving conditions. In another example, the processor is also configured to detect a moving object in the roadway from the plurality of laser data points; detect a cloud of laser data points of the plurality of laser data points which do not indicate a particular structure located proximate to the moving object; when the cloud is detected, identifying a second indication that the roadway is wet; and the second indication that the roadway is wet is used by the processor to estimate the driving conditions. In another example, the processor is also configured to access detailed map information for the roadway indicating an expected elevation of the roadway; identify a clouds of laser data points from the received laser data points associated with location data proximate to an expected surface of the roadway; compare the laser data points of the cloud to a first threshold value above the expected roadway surface and a second threshold value below the expected roadway surface; when the laser data points of the cloud include at least one laser data point above the first threshold value and at least one laser data point below the second threshold value, identify a second indication that the roadway is wet; and the second indication that the roadway is wet is used by the processor to estimate the driving conditions. In another example, the processor is also configured to receive images captured from a camera as the vehicle is driven along the roadway; identify an additional indication that the roadway is wet conditions based on the images; and the additional indication that the roadway is wet is used by the processor to estimate the driving conditions. In another example, the processor is also configured to receive precipitation data from a precipitation sensor associated with the vehicle; identify a second indication that the roadway is wet based on the precipitation data; and the second indication that the roadway is wet is used by the processor to estimate the driving condition. In another example, estimating the driving condition the processor is configured to use a Bayesian estimate. In another example, the processor is also configured to access detailed map information for the roadway indicating an expected elevation of the roadway; determine an average elevation for a portion of the roadway; identify a second indication that the roadway is wet based on whether the average elevation of the portion of the roadway is at least a second threshold value greater than the expected elevation; and the second indication that the roadway is wet is used by the processor to estimate the driving condition. In another example, the processor is also configured to receive weather information for a current location of the vehicle from a server over a network; identify a second indication that the roadway is wet based on the weather related information; and the second indication that the roadway is wet is used by the processor to estimate the driving condition.

DETAILED DESCRIPTION

In one aspect of the disclosure, laser scan data including data points collected along a roadway may be received by a computer. The laser scan data may include data points indicating the location and intensity of objects, roadway features, etc. in the laser's surroundings including the roadway, and in some examples, the world beyond the boundaries of the roadway. This information may be used to identify one or more road weather conditions as described in detail below. In addition, images captured from a camera may be received by the computer. Like the laser data, the images may include information about the camera's surroundings including the roadway. The images may be then used to identify an indication of road weather conditions. Data from a precipitation sensor may be received by the computer, and may be used to identify an indication of road weather conditions. Weather related information may be received by the computer from a server over a network. The weather related information may be used to identify an indication of road weather conditions. The identified indications may then be used to estimate the driving conditions of the roadway. The estimate may be used to make a driving decision as described in more detail below.

Figure 1:
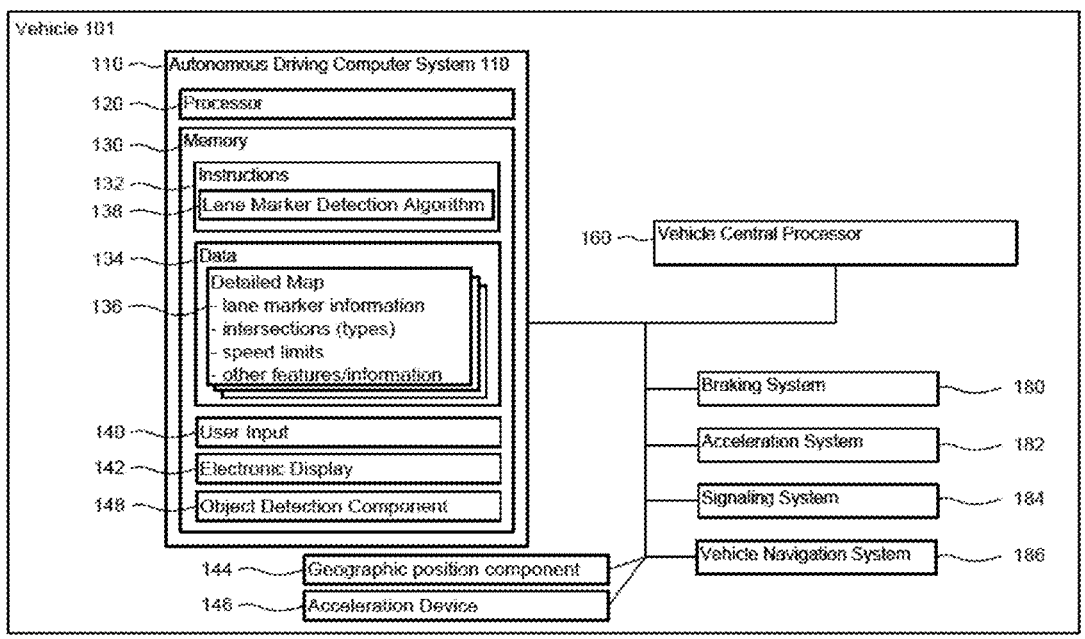
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
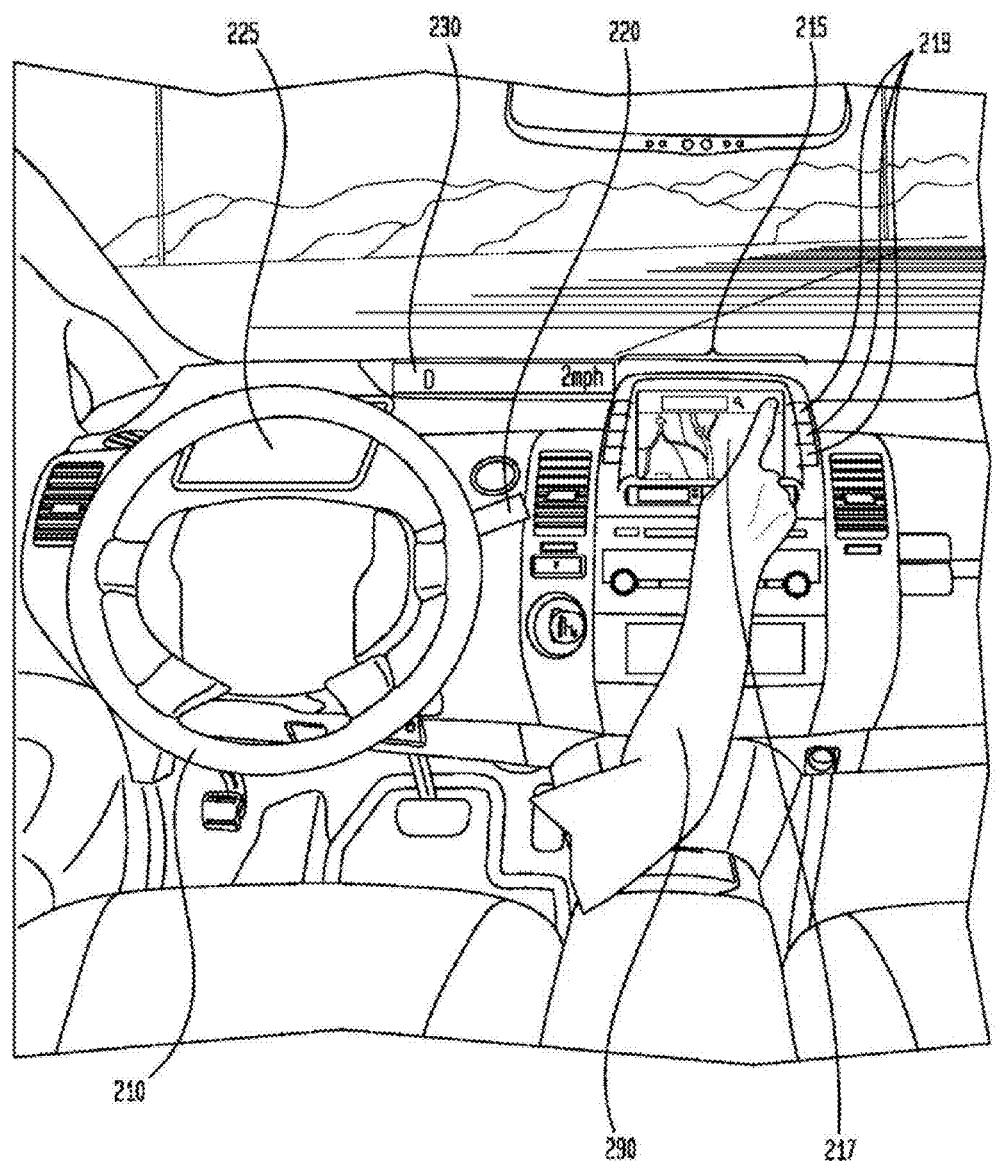
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle.

For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3A:
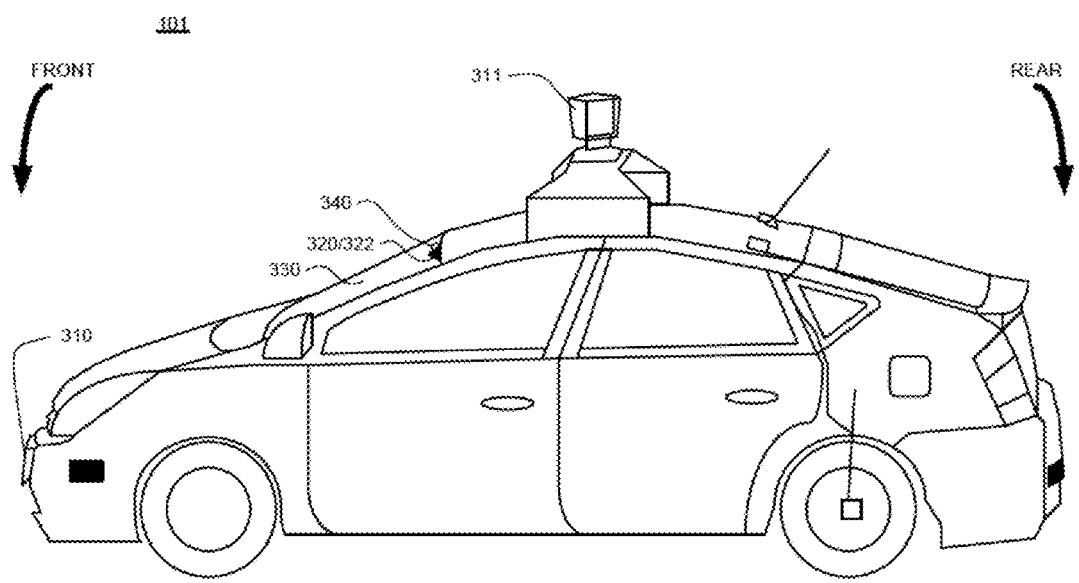
FIG. 3A is an exterior of an autonomous vehicle in accordance with aspects of the disclosure.

The vehicle may also include components 148 for detecting objects and conditions external to the vehicle such as other vehicles, obstacles in the roadway, traffic signals, signs, trees, etc. The detection system may include lasers, sonar, radar, cameras, precipitation sensors, or any other detection devices which record data which may be processed by computer 110. For example, if the vehicle is a small passenger vehicle, the car may include a laser mounted on the roof or other convenient location. As shown in FIG. 3A, vehicle 101 may comprise a small passenger vehicle. In this example, vehicle 101 sensors may include lasers 310 and 311, mounted on the front and top of the vehicle, respectively. The lasers may include commercially available lasers such as the Velodyne HDL-64 or other models. The lasers may include more than one laser beam; for example, a Velodyne HDL-64 laser may include 64 beams. In one example, the beams of laser 310 may have a range of 150 meters, a thirty degree vertical field of view, and a thirty degree horizontal field of view. The beams of laser 311 may have a range of 50-80 meters, a thirty degree vertical field of view, and a 360 degree horizontal field of view. The lasers may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

As noted above, the vehicle may also include one or more cameras. The cameras may be mounted at predetermined distances so that the parallax from the images of 2 or more cameras may be used to compute the distance to various objects. As shown in FIG. 3A, vehicle 300 may include 2 cameras 320-321 mounted under a windshield 330 near the rear view mirror (not shown). In one example, camera 320 may include a range of 200 meters and a 30 degree horizontal field of view, while camera 321 may include a range of 100 meters and a 60 degree horizontal field of view.

The vehicle may also include one or more precipitation sensors. In one example, as with typical vehicles, a precipitation sensor 340 may be mounted under or incorporated into the windshield 330. Precipitation sensors may also be mounted at various other locations, such as at or near the location of headlamps, etc. In one example, a precipitation sensor may include a set of one or more infrared light-emitting diodes (LEDs) and a photodetector such as a photodiode. Light emitted by the LEDs may be reflected by the windshield back to the photodiode. The less light the photodiode receives, the more precipitation outside of the vehicle. The amount of reflected light or some other indicator of the detected amount of precipitation may be passed to computer 110.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information. In some examples, the detailed map information may include data describing the expected brightness or laser intensity data values for different stretches of roadway.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 4:
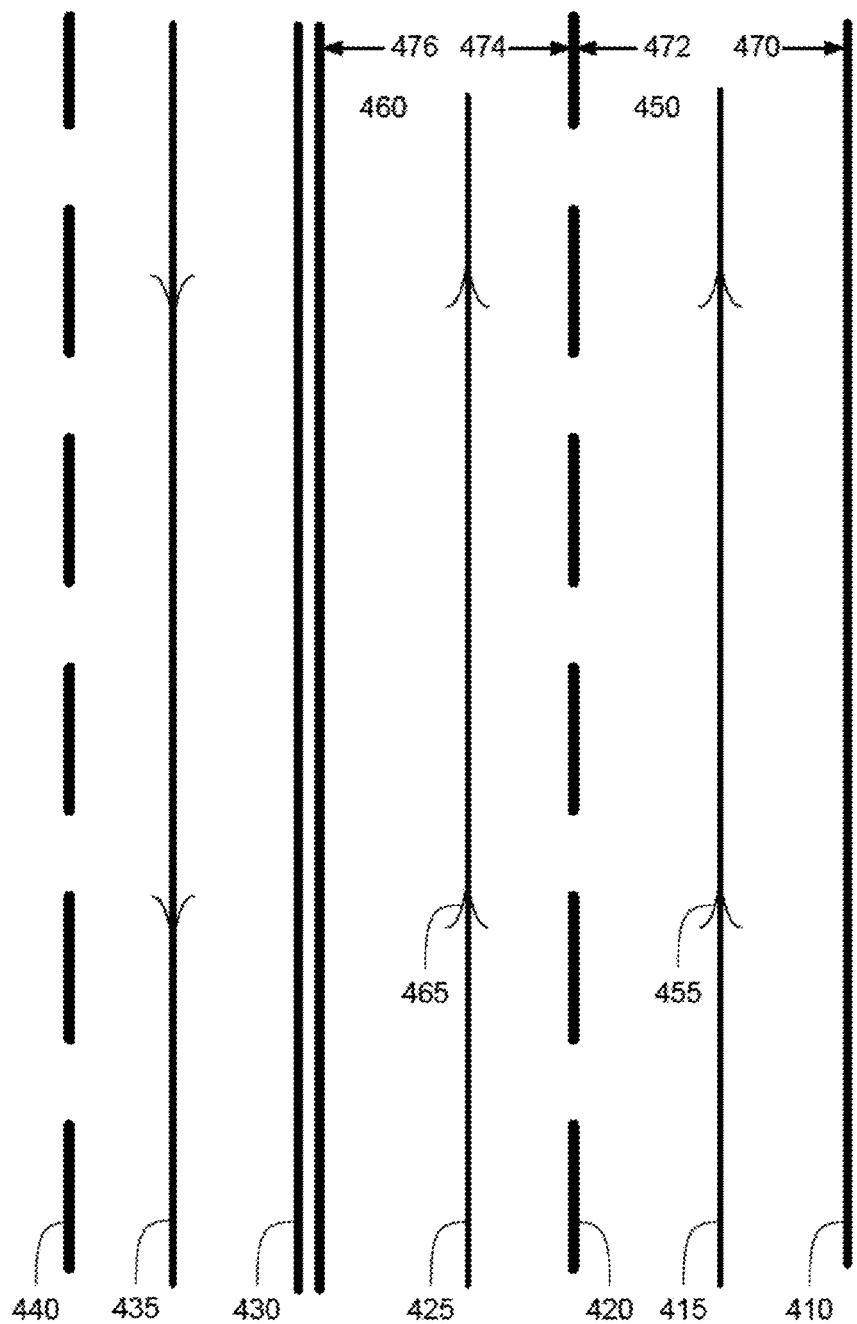
FIG. 4 is a diagram of map information in accordance with aspects of the disclosure.

FIG. 4 depicts a detailed map 400 including the same example section of roadway (as well as information outside of the range of the laser). The detailed map of the section of roadway includes information such as solid lane line 410, broken lane lines 420, 440, and double solid lane lines 430. These lane lines define lanes 450 and 460. Each lane is associated with a rail 455, 465 which indicates the direction in which a vehicle should generally travel in the respective lane. For example, a vehicle may follow rail 465 when driving along lane 460. In this example, lane 450 is bounded by a right lane line 410 and a left lane line 420, and lane 460 is bounded by a right lane line 420 and a left lane line 430. The edges for lane 450 are edges 470, 472 while the edges for lane 460 are edges 474, 476.

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 3B:
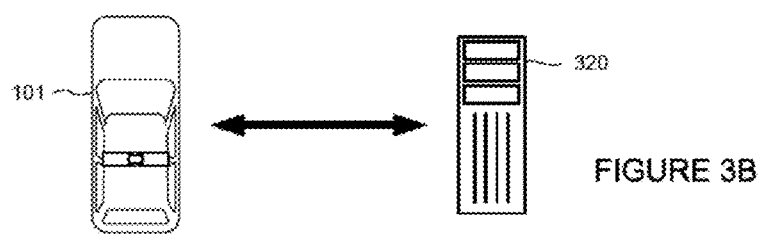
FIG. 3B is a pictorial diagram of a system in accordance with aspects of the disclosure.
Figure 3C:
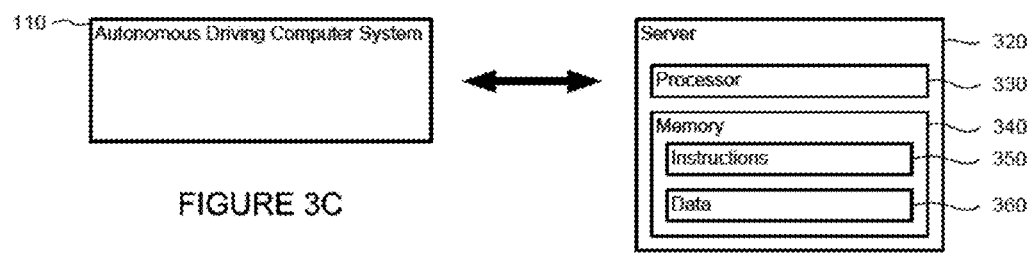
FIG. 3C is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

In one example, data 370 of server 320 may include provide weather related information. For example, server 320 may receive, monitor, store, update, and transmit various information related to weather. This information may include, for example, precipitation, cloud, and/or temperature information in the form of reports, radar information, forecasts, etc.

In addition to the operations described above and illustrated in the figures, various operations will now be described.

It should be understood that the following operations do not have to be performed in the precise order described below. Rather, various steps can be handled in a different order or simultaneously, and steps may also be added or omitted.

Figure 5:
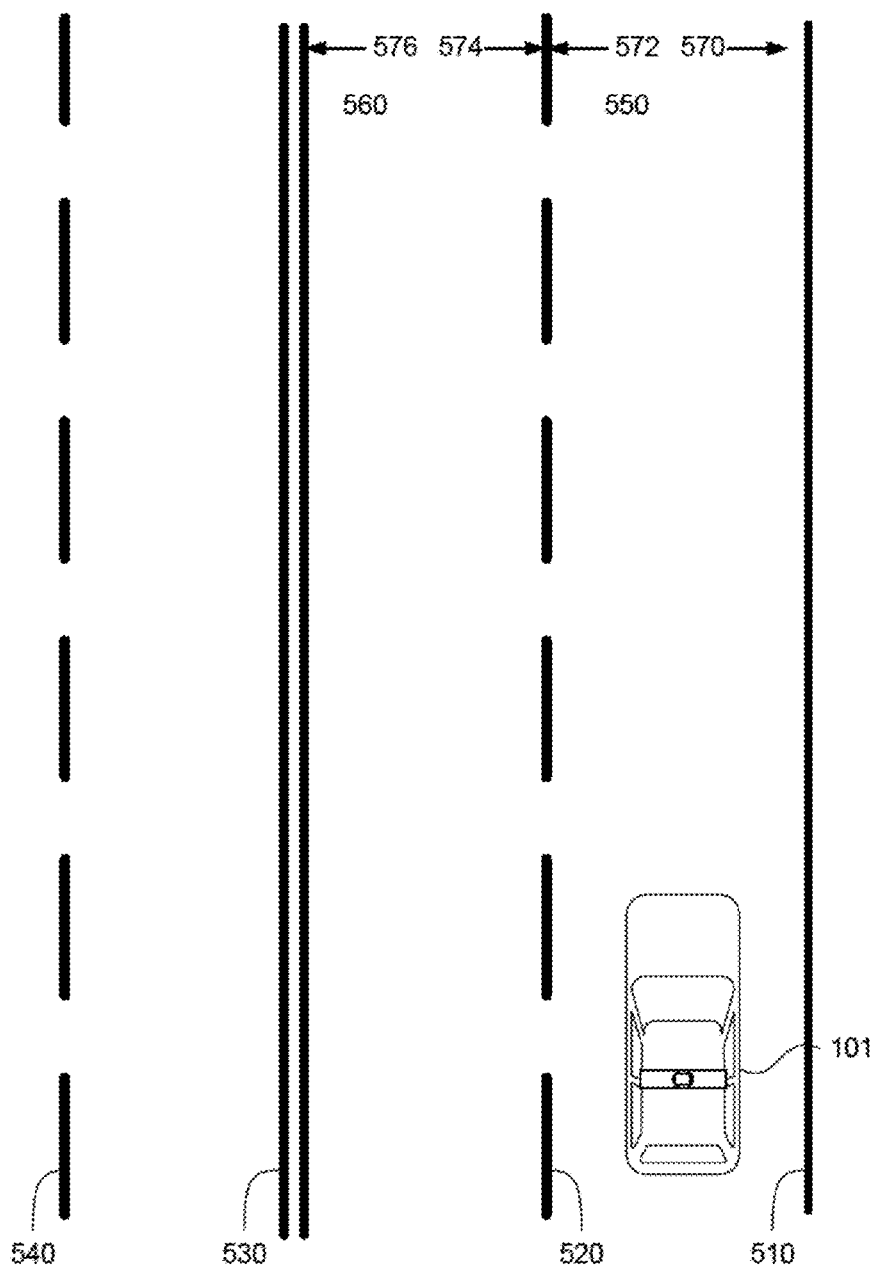
FIG. 5 is a diagram of laser data in accordance with an implementation.

A vehicle including one or more sensors may be driven along a roadway. For example, the sensors may include a laser. The laser may be an off board sensor attached to a typical vehicle or a part of an autonomous driving system, such as vehicle 101. FIG. 5 depicts vehicle 101 on a section of the roadway 500 corresponding to the detailed map information of FIG. 4. In this example, the roadway includes solid lane line 510, broken lane lines 520 and 540, double lane lines 530, and lanes 550 and 560.

As the vehicle's laser or lasers are moved along, the vehicle may collect data points including range and intensity information for the same location (point or area) from several directions and/or at different times. For example, each data point may include an intensity value indicative of the reflectivity of the object from which the light was received by the laser as well as location information. For example, highly reflective surfaces such as lane markers would be associated with an intensity value which is greater than less reflective surfaces such as blacktop, cement, or other roadway surfaces. Similarly, darker objects (black, navy blue, brown, etc.) which absorb more light would be associated with a much lower intensity value than lighter colored objects which would reflect more light (white, cream, silver, etc.). In this regard, when an object is wet, it may actually become darker and therefore, rather than increasing the intensity value of an object, the water may decrease the intensity value.

In some examples, the intensity values may be scaled, for example, from 0-250, where 0 is very dark to and 250 very bright. Thus, more reflective, brighter surfaces may be associated with intensity values closer to 250, while less reflective, darker surfaces may be associated with intensity values closer to 0.

For example, the laser scan data may be received and processed by computer 110 (or computer 320) to generate geographic location coordinates. These geographic location coordinates may include GPS latitude and longitude coordinates (x,y) with an elevation component (z), or may be associated with other coordinate systems. The result of this processing is a set of data point. Each data point of this set may include an intensity value indicative of the reflectivity of the object from which the light was received by the laser as well as location information: (x,y,z).

Figure 6:
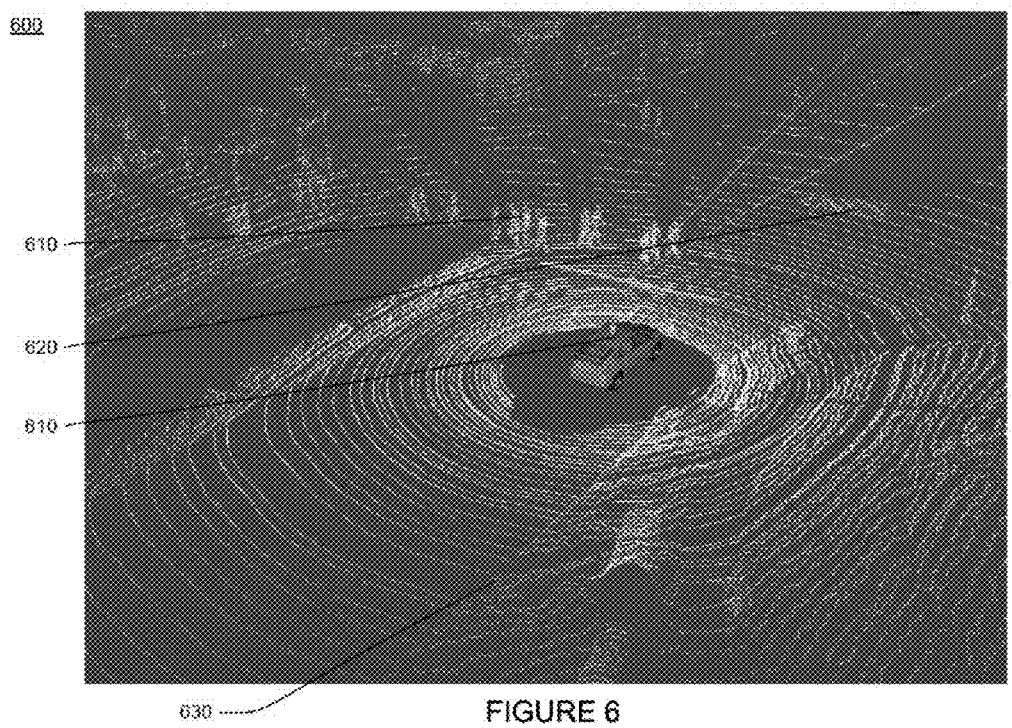
FIG. 6 is another diagram of laser data in accordance with an implementation.

FIG. 6 depicts an exemplary image 600 of vehicle 101 approaching an intersection. The image was generated from laser scan data collected by the vehicle's lasers for a single 360 degree scan of the vehicle's surroundings, for example, using the data points of all of the beams of the collecting laser(s). The white lines represent how the laser "sees" its surroundings. When the data points of a plurality of beams are considered together, the data points may indicate the shape and three-dimensional (3D) location (x,y,z) of other items in the vehicle's surroundings. For example, the laser scan data may indicate the outline, shape and distance from vehicle 101 of various objects such as people 610, vehicles 620, and curb 630.

In addition to identifying objects and roadway features in the vehicle's surroundings, the computer 110 may also detect indications of weather conditions which may affect computer 110's ability to safely control vehicle 101 ("road weather conditions"). These road weather conditions may include conditions such as wet or icy conditions, snowy conditions, foggy conditions, etc.

In some aspects of the disclosure, computer 110 may detect indications of wet roadway conditions. In one example, the computer may examine the average intensity of the laser data points for a roadway and compare this to a threshold to identify an indication of whether the roadway is wet. For example, as noted above, the water covering wet or icy areas of the roadway may decrease the intensity of the roadway. Thus, a wet roadway may have average intensity values that are somewhat lower that of dry roadways (such as cement, blacktop, brick, etc.) as well as other expected roadway features such as lane markers, etc. that appear in the map information.

When determining the average intensity of the laser data points, all of the laser data points and intensity values associated with or within the roadway or some portion of the roadway may be examined. For example, the vehicle may examine data points associate with an area directly in front of the vehicle in the vehicle's lane, all lanes which move traffic in the same general direction as the vehicle's current lane, all data points within the roadway associated with the field of view of the vehicle's laser or lasers, etc. If some percentage of the examined laser data points have intensity values below a certain threshold value, the computer may determine that the roadway is wet. For example, using the 0 to 250 scale described above, if there are 1000 laser data points in the roadway and at least 850 of these 1000 points (or at least 85% of these laser data points) have an intensity below a threshold of 10, the roadway is very dark. As noted above, a lower intensity value may indicate a high probability that the roadway is wet. Other thresholds and percentages may also be used, for example, based on the expected intensity or the composition of the roadway. In this regard, the threshold value used for blacktop may be lower than the threshold value used for cement or brick roadways.

Figure 7:
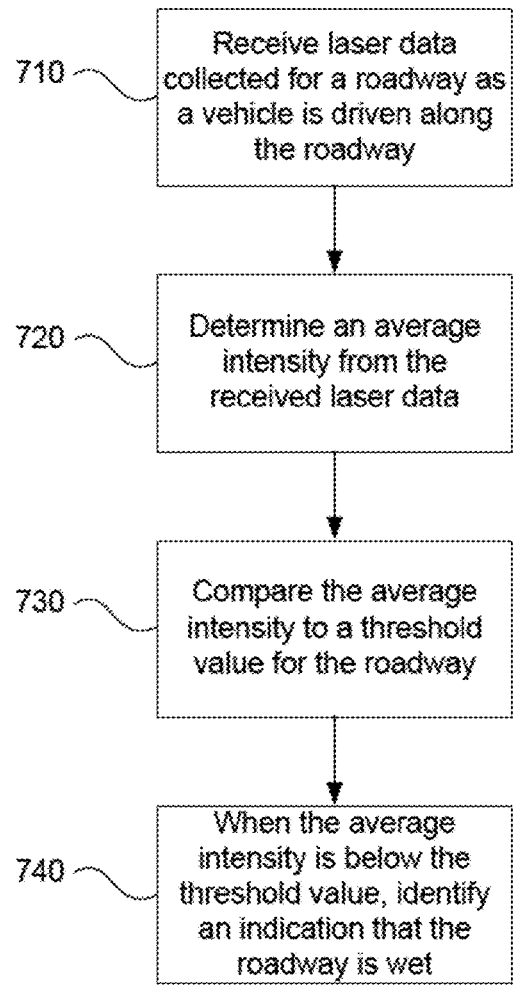
FIG. 7 is a flow diagram in accordance with an implementation.

Flow diagram 700 of FIG. 7 is an example of how computer 110 may use the average intensity of the roadway as well as a threshold value to identify an indication that the roadway is wet. In this example, computer 110 receives laser data collected for a roadway as a vehicle is driven along the roadway at block 710. As noted above, the laser data includes a plurality of laser data points having location and intensity information. At block 720, computer 110 determines an average intensity from the received laser data. This average intensity is compared to a threshold value for the roadway at block 730. When the average intensity is below the threshold value, the computer then identifies an indication that the roadway is wet at block 740.

In another example, the computer may examine variations in the intensity of the roadway to identify an indication of whether the roadway is wet. For example, computer 110 may compute the standard deviation or distribution of intensity values along a portion of the roadway. During dry conditions, the distribution of intensity values may be close to a Gaussian model centered around an expected intensity value for a dry roadway. For example, no matter where the roadway is located, in dry conditions, the intensity values would be expected to cluster around similar values. If the distribution of the intensity values has shifted from close to that expected for dry conditions towards a lower intensity, the computer may determine that the roadway is darker. This may indicate that the roadway is wet, for example, if the roadway includes wet areas of the roadway such as puddles or wet tire tracks.

Figure 8:
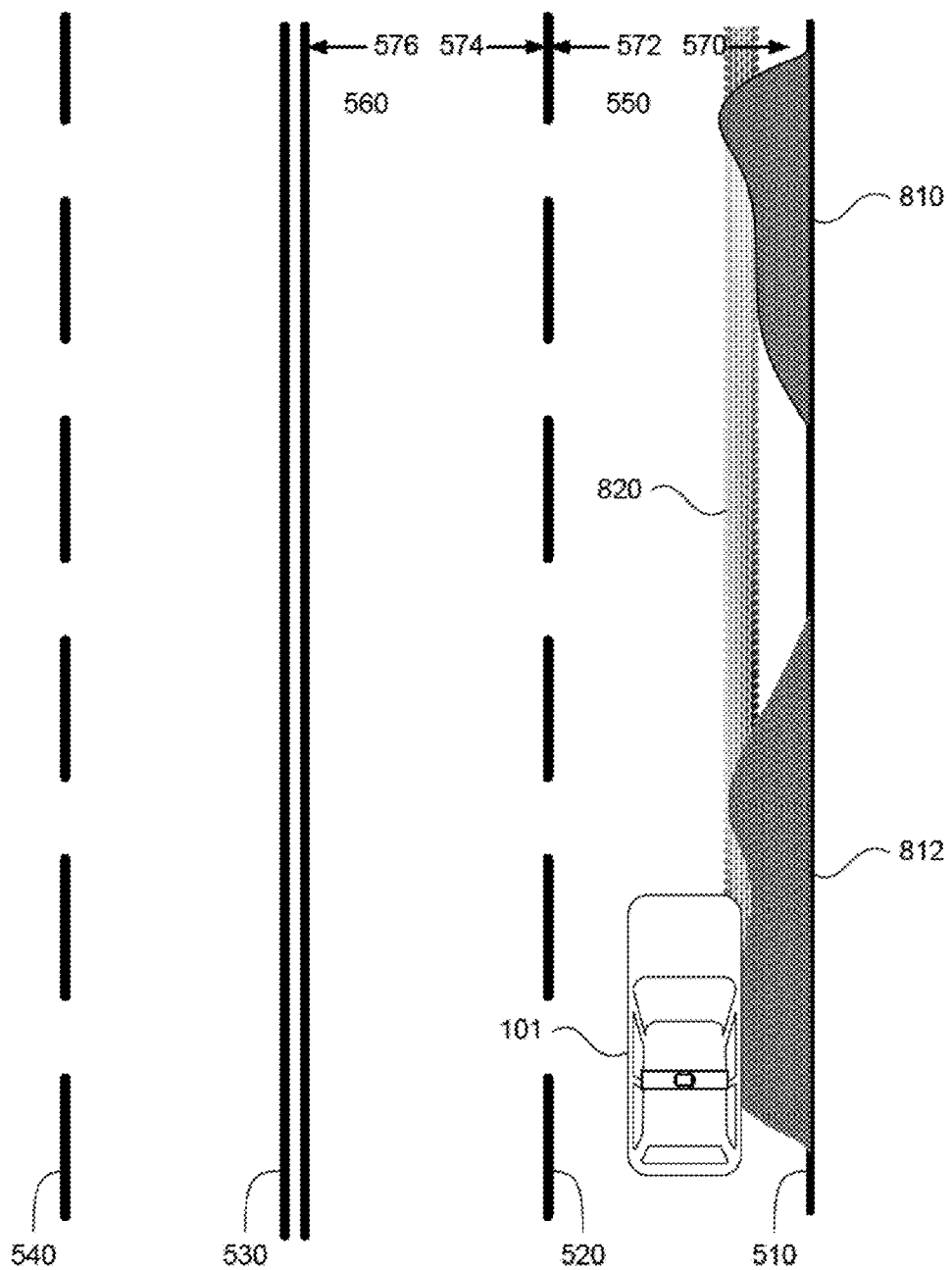
FIG. 8 is a diagram of a roadway in accordance with an implementation.
Figure 9A:
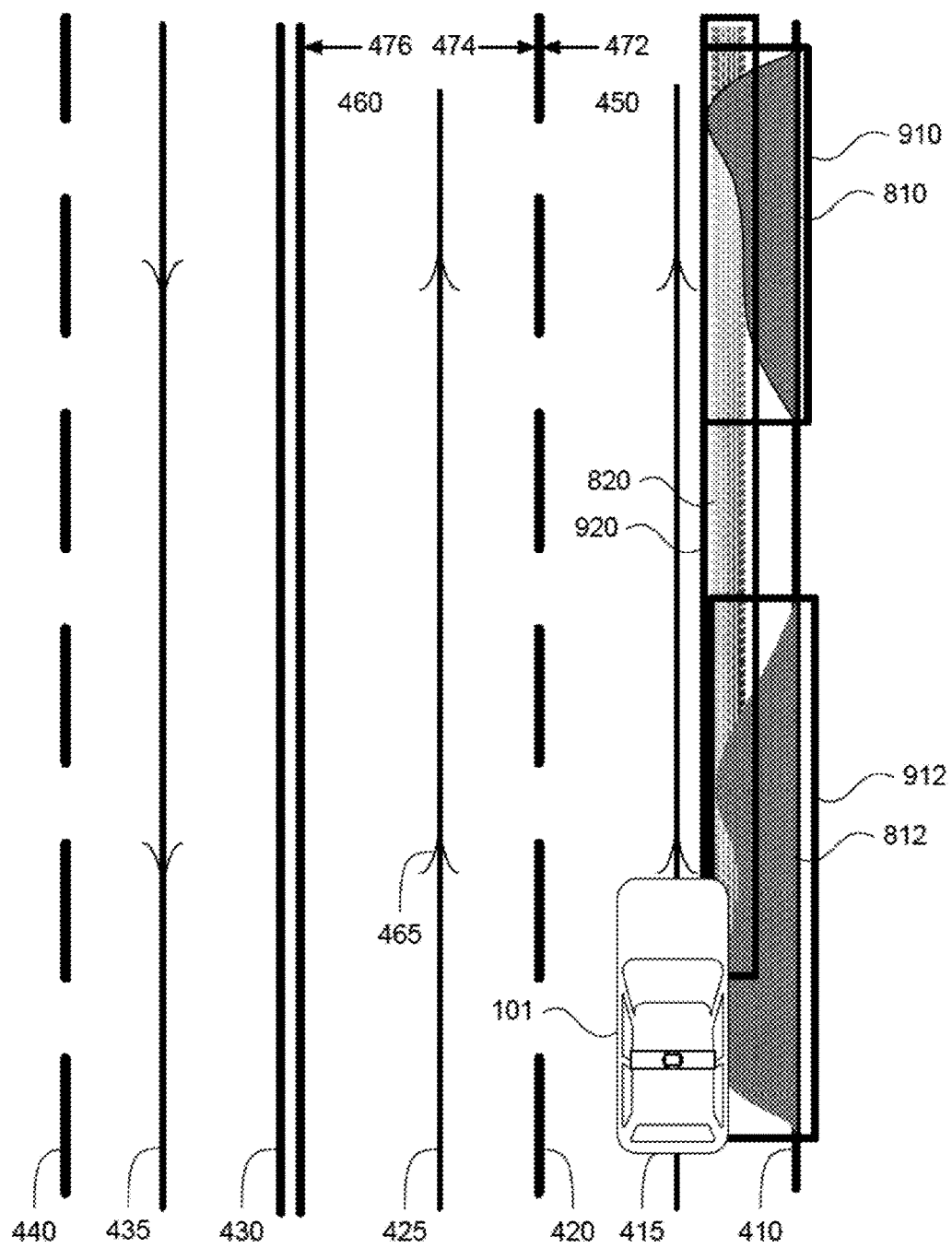
FIG. 9A is a diagram of a roadway and data in accordance with an implementation.
Figure 9B:
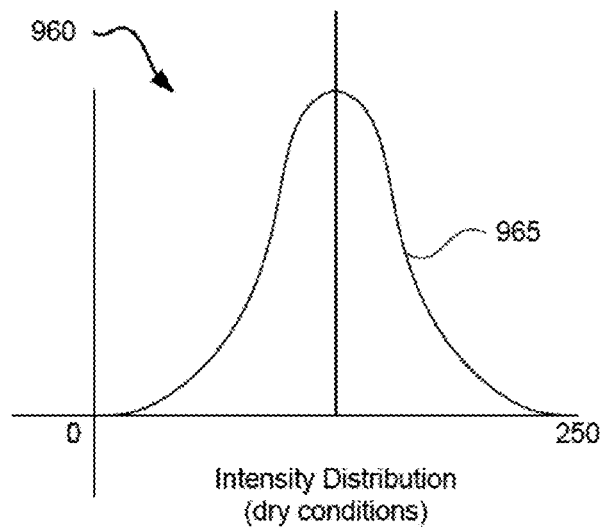
FIG. 9B is graphs of example data in accordance with an implementation.
Figure 9B:
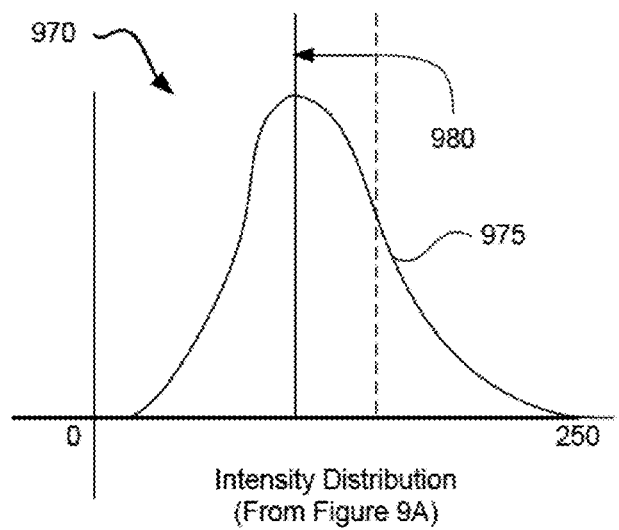

FIG. 8 is one example of roadway 500 having various indicators of wet conditions. In this example, lane 550 includes some puddles 810 and 812 from a previous or present rainfall. After another vehicle has driven through these puddles, the vehicle may leave behind wet tire tracks 820. FIG. 9A depicts an example of processed laser data points from the example of FIG. 8 compared to the detailed map information for roadway 500 of FIG. 4. In this example, features 910, 912, and 920 represent the general location of the laser data points for puddles 810, 812, and tracks 820, respectively. These features 910, 912, and 920 may be associated with laser data points with intensity values that have an average intensity value than is somewhat lower than the rest of the lane 550. Turning to FIG. 9B, graph 960 depicts an example of a distribution 965 of intensity values for expected for dry conditions. Graph 970 depicts and example of a distribution 975 for the intensity values in an examples such as FIG. 9A. In this example, the distribution has shifted (in the direction of arrow 980) towards 0 or the darker end of the intensity scale. As noted above, computer 110 may use this shift to determine that the roadway is wet, or at least includes some wet areas.

Figure 10:
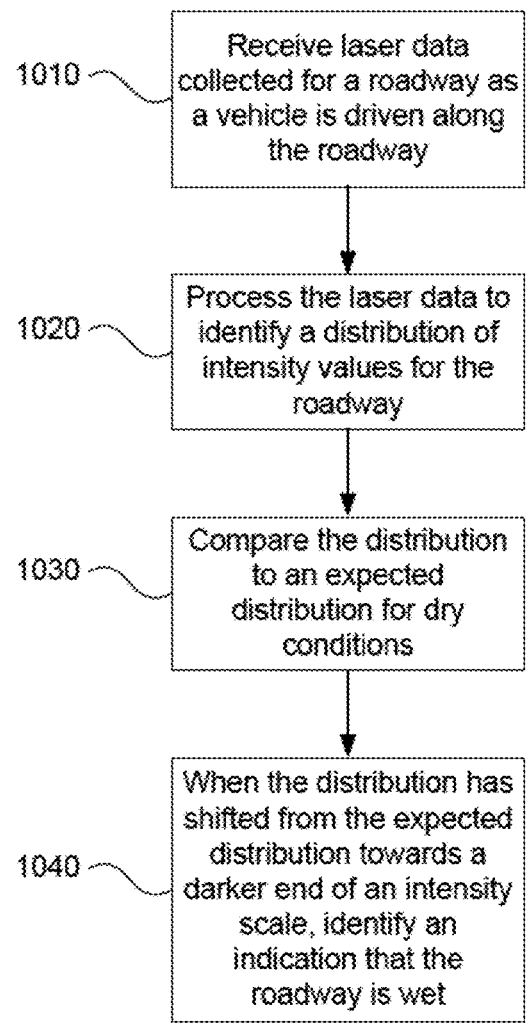
FIG. 10 is another flow diagram in accordance with an implementation.

Flow diagram 1000 of FIG. 10 is an example of how computer 110 may use variations in the intensity of the roadway to identify an indication that the roadway is wet. In this example, computer 110 receives laser data collected for a roadway as a vehicle is driven along the roadway at block 1010. As noted above, the laser data includes a plurality of laser data points having location and intensity information. At block 1020, computer 110 processes the laser data to identify a distribution of intensity values for the roadway. This distribution of intensity values is then compared to an expected distribution of intensity values for the roadway under dry weather conditions at block 1030. When the distribution of intensity values has shifted from the expected distribution of intensity values for the roadway under dry weather conditions towards a darker end of an intensity scale, the computer then identifies an indication that the roadway is wet at block 1040.

Figure 11A:
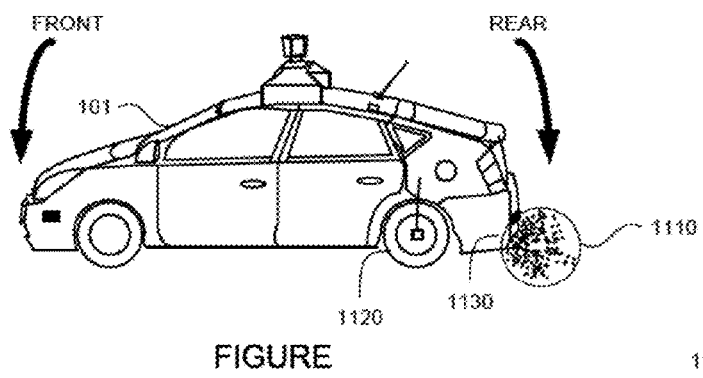
FIGS. 11A and 11B are views of a vehicle and data point clouds.
Figure 11B:
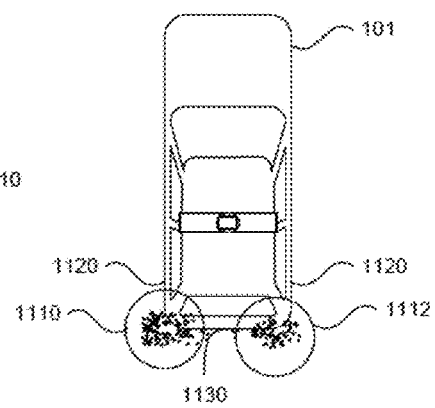

In a further example, the computer may identify an indication that the roadway is wet by detecting whether water is being kicked up by a vehicle's tires. For example, when the roadway surface is so wet that the water is being kicked up by the tires of the autonomous vehicle, the computer 110 may detect random laser points behind the wheels. In this regard, computer 110 may detect a cloud or clouds 1110, 1112 of random data points directly behind the rear tires 1120 and/or bumper 1130 of vehicle 101 as shown in FIGS. 11A and 11B. As a consequence of the moving water, the location and number of the data points within the clouds may constantly be changing. Thus, a cloud of data points from water would not have a definitive structure, whereas a portion of solid object, such as the rear end of a vehicle, would be associated with data points defining a much clearer surface. Similar data point clouds may also be observed behind other vehicles. Such observations may indicate that it is raining or the ground is really wet.

Figure 12:
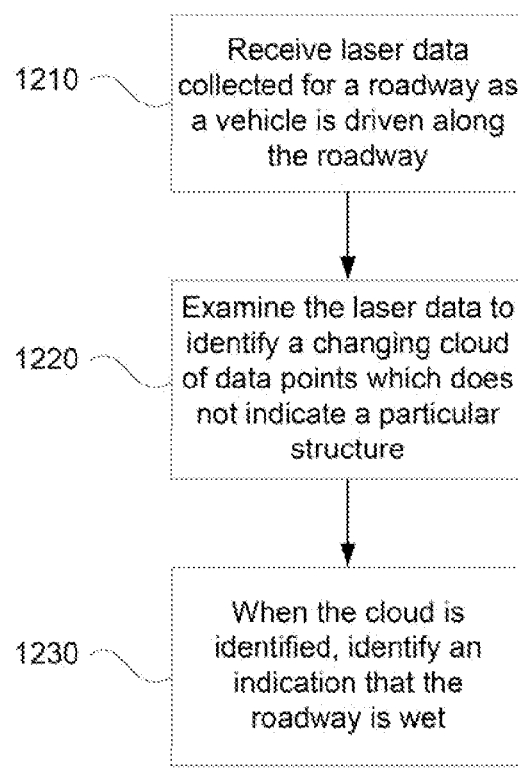
FIG. 12 is a further flow diagram in accordance with an implementation.

Flow diagram 1200 of FIG. 12 is an example of how computer 110 may examine clouds of laser data points to identify an indication that the roadway is wet. In this example, computer 110 receives laser data collected for a roadway as a vehicle is driven along the roadway at block 1210. As noted above, the laser data includes a plurality of laser data points having location information. At block 1220, computer 110 examines the laser data to identify a changing cloud of data points which does not indicate a particular structure. These data points may also be associated with vehicle 101 or another moving object detected in the roadway. When the cloud is identified, the computer then identifies an indication that the roadway is wet at block 1230.

Figure 13:
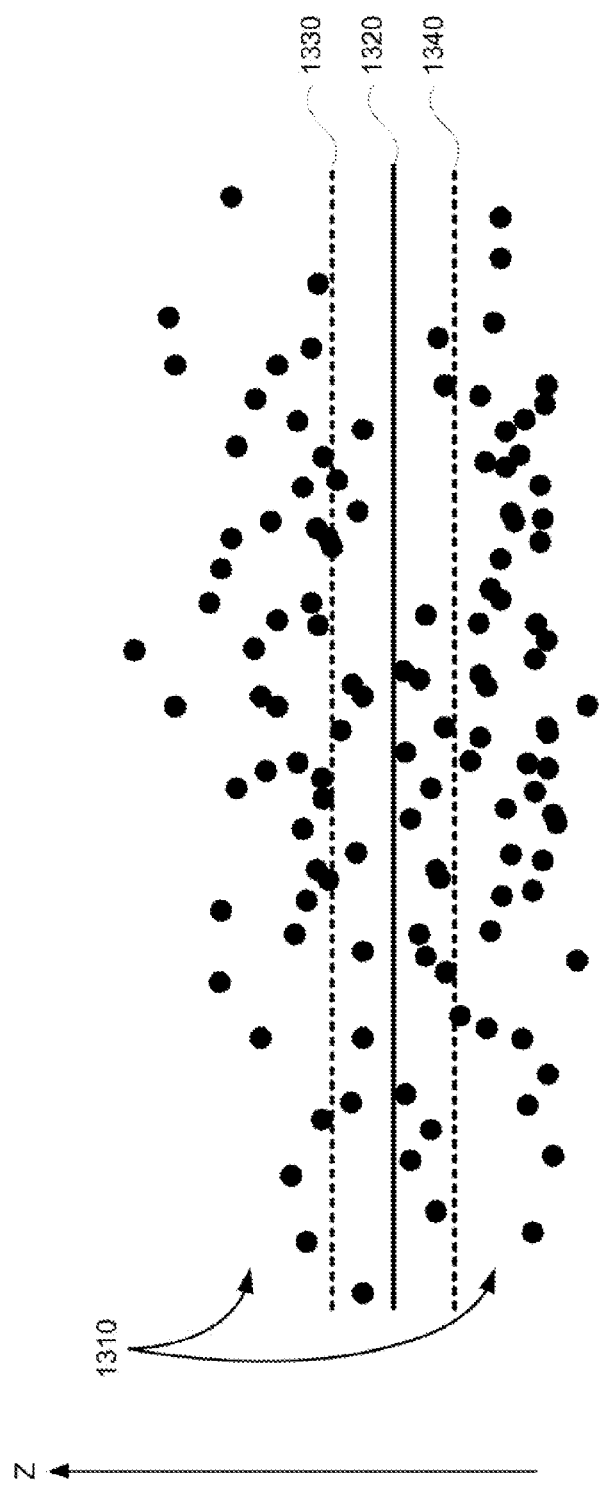
FIG. 13 is a diagram of laser data in accordance with an implementation.

In yet another example, the location of the laser data points may be used by computer 110 to identify an indication that the roadway is wet. For example, when a roadway is very wet, such as where there is a deep puddle, the water may have a glassy appearance. In this regard, some of the water may act as a mirror reflecting laser light while some of the laser light may travel through the water and be reflected by the roadway surface. As shown in the example of FIG. 13, the laser light may hit the wet roadway surface and return a laser data point cloud 1310 in the area of a puddle. Some of these laser data points may appear above or below the ground 1320. Thus, computer 110 may observe objects both above and below the expected roadway surface. Given that the data points would typically be detected slightly above and below an expected surface of the roadway in the detailed map information, distance thresholds 1330 and 1340, such as 15-20 cm above and below the roadway surface, may be used to identify a cloud of data points associated with dry roadway surface from a cloud associated with a puddle of water. Thus, as the cloud of data points 1310 of FIG. 13 includes data points both above threshold 1330 and below threshold 1340, the data points may be associated with a puddle. Computer 110 may use such an indication to determine that the roadway is wet.

Figure 14:
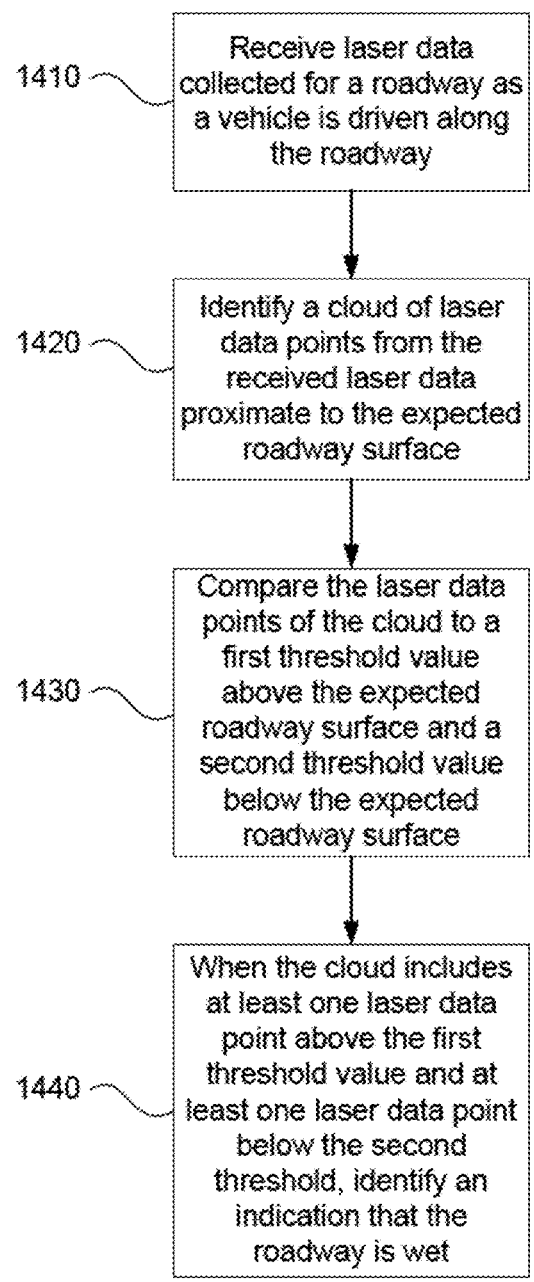
FIG. 14 is a flow diagram in accordance with an implementation.

Flow diagram 1400 of FIG. 14 is another example of how computer 110 may use clouds of laser data points to identify an indication that the roadway is wet. In this example, computer 110 receives laser data collected for a roadway as a vehicle is driven along the roadway at block 1410. As noted above, the laser data includes a plurality of laser data points having location information. At block 1420, computer 110 identifies a cloud of laser data points proximate to the expected surface of the roadway (as determined from the detailed map 136). The laser data points of the cloud are compared to a first threshold value located above the expected surface of the roadway and a second threshold value located below the expected surface of the roadway at block 1430. When the cloud includes at least one laser data point above the first threshold value and at least one laser data point below the second threshold value, the computer then identifies an indication that the roadway is wet at block 1440.

As indicated above, in addition to identifying indications that the roadway is wet, computer 110 may also identify indications of snowy conditions such as when the roadway is at least partially snow covered. For example, because of its color and reflectivity snow may have a higher intensity that than of the surface of the roadway. As noted above, during dry conditions, the distribution of intensity values may be close to a Gaussian model centered around an expected intensity value for a dry (non snow-covered) roadway. For example, no matter where the roadway is located, in dry conditions, the intensity values would be expected to cluster around similar values. Thus, if the distribution of the intensity values has shifted from close to that expected for dry conditions towards a higher intensity, the computer may determine that the roadway is brighter. This may indicate that the roadway is at least partially snow covered.

Figure 15A:
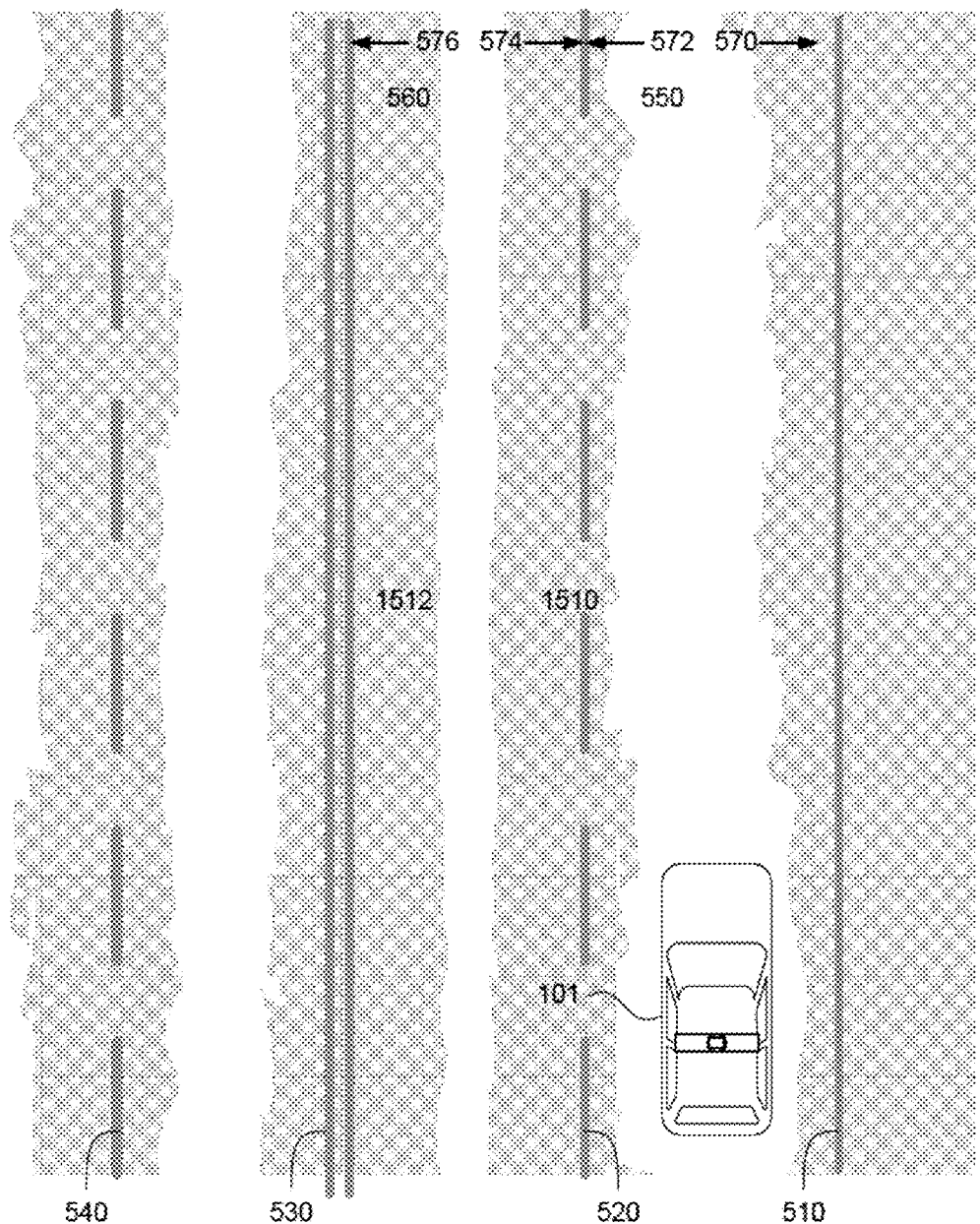
FIG. 15A is another diagram of a roadway in accordance with an implementation.
Figure 15B:
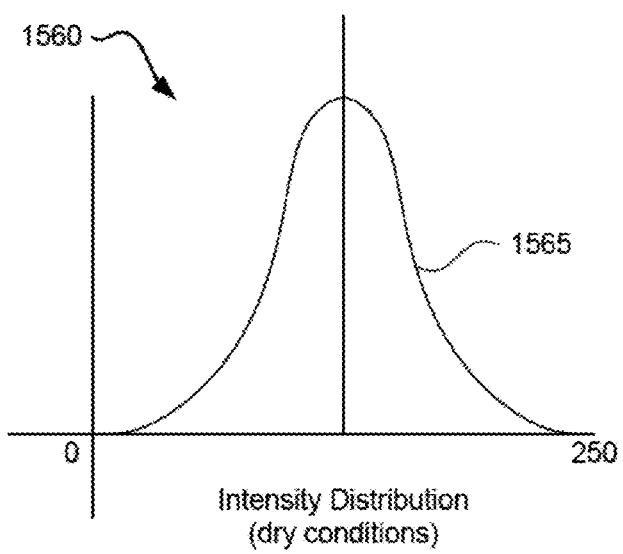
FIG. 15B is graphs of example data in accordance with an implementation.
Figure 15B:
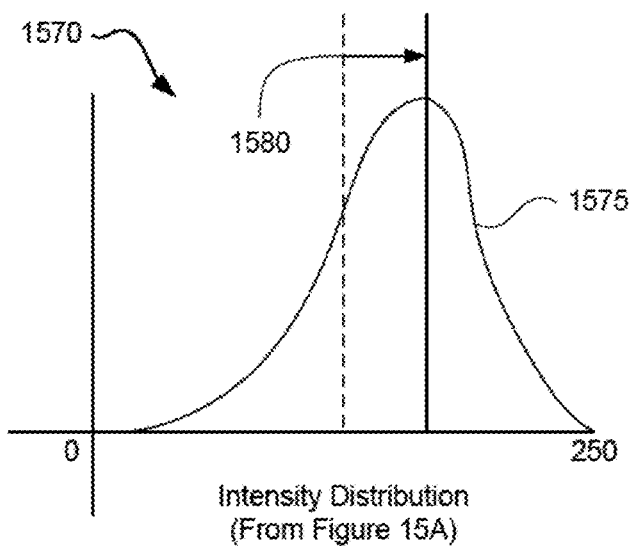
Figure 16:
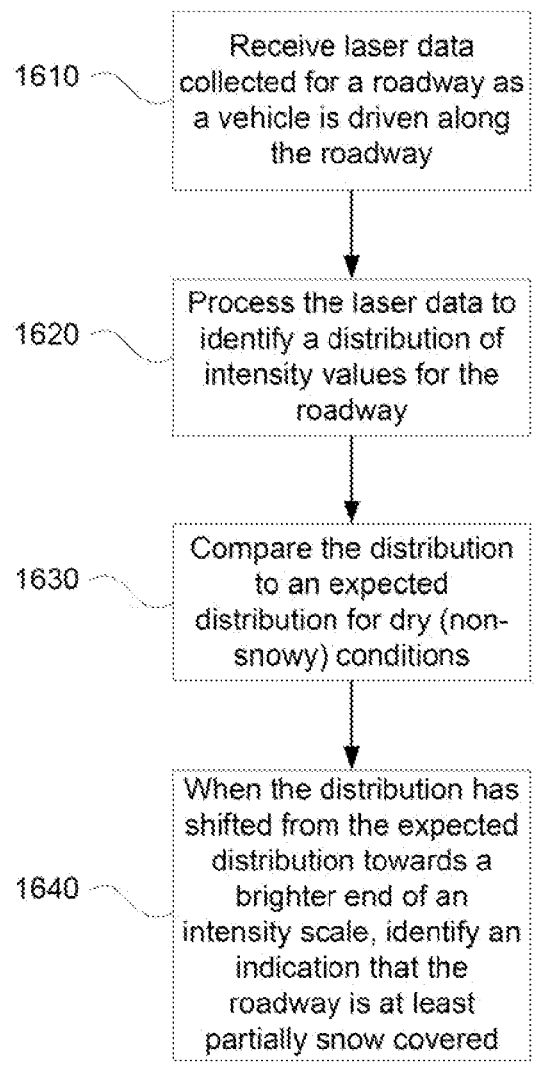
FIG. 16 is another flow diagram in accordance with an implementation.

FIG. 15 is an example of roadway 500 having snowy conditions. In this example, roadway 500 is lightly covered in some areas 1510, 1512 with snow and/or ice. Turning to FIG. 15B, graph 1560 depicts an example of a distribution 1565 of intensity values for expected for dry conditions, for example, when the roadway is not partially snow covered. Graph 1570 depicts and example of a distribution 1575 for the intensity values in an example such as FIG. 15A. In this example, the distribution has shifted (in the direction of arrow 1580) towards 250 or the brighter end of the intensity scale. As noted above, computer 110 may use this shift to determine that the roadway is snowy, or at least includes some snow covered areas.

Flow diagram 1600 of FIG. 60 is an example of how computer 110 may use variations in the intensity of the roadway to identify an indication that the roadway is at least partially snow covered. In this example, computer 110 receives laser data collected for a roadway as a vehicle is driven along the roadway at block 1610. As noted above, the laser data includes a plurality of laser data points having location and intensity information. At block 1620, computer 110 processes the laser data to identify a distribution of intensity values for the roadway. This distribution of intensity values is then compared to an expected distribution of intensity values for the roadway under dry weather conditions at block 1630. When the distribution of intensity values has shifted from the expected distribution of intensity values for the roadway under dry weather conditions towards a darker end of an intensity scale, the computer then identifies an indication that the roadway is at least partially snow covered at block 1640.

Figure 17:
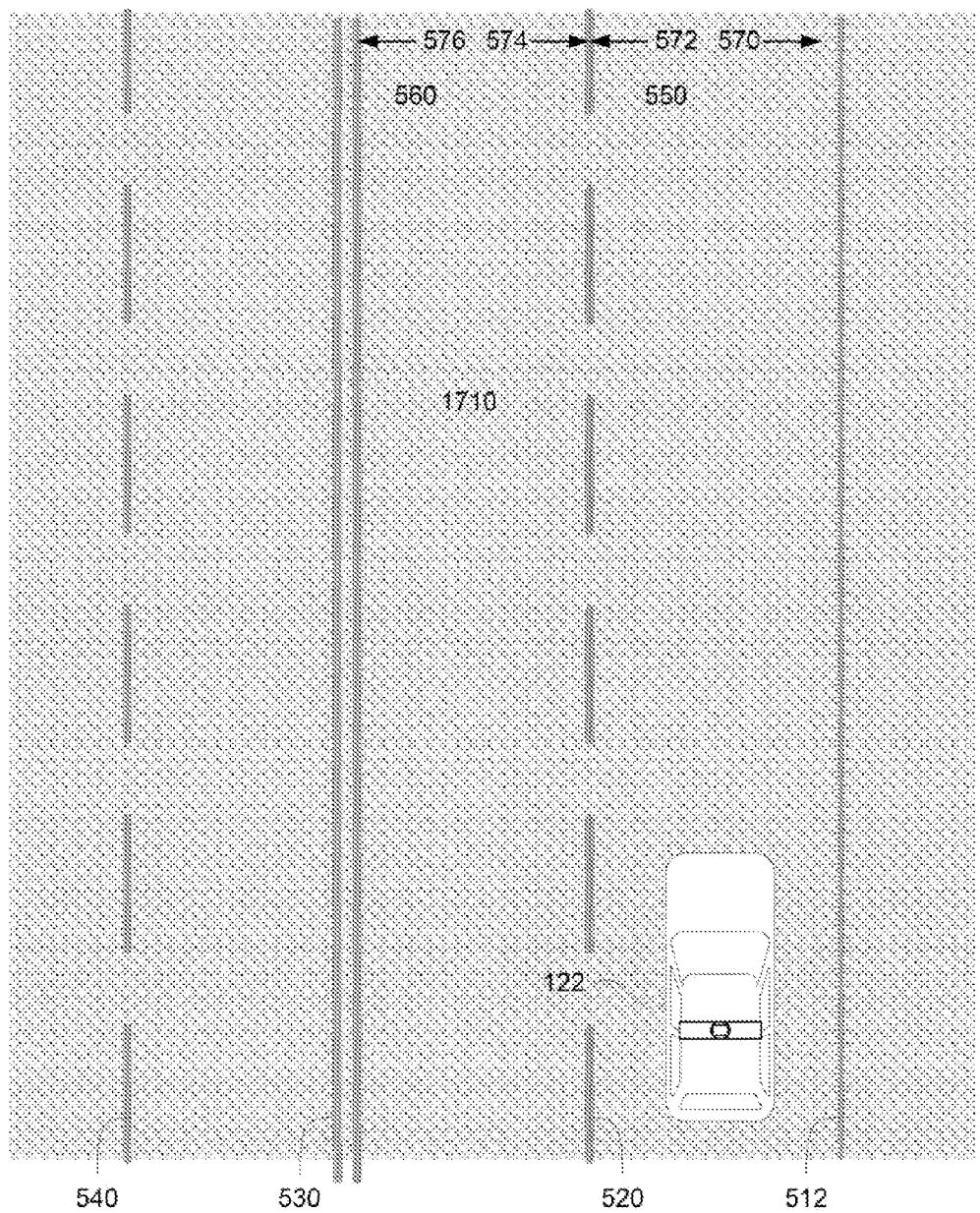
FIG. 17 is a further diagram of a roadway in accordance with an implementation.

In another example, computer 110 may use the average intensity of the roadway to identify an indication of that the roadway is at least partially snow covered. For example, as shown in FIG. 17, the entire roadway 500 is covered in snow and/or ice 1710. As these surface coverings may be more reflective than the surface of the roadway, the snow or ice may cause the laser intensity data collected from the roadway at least a threshold higher than the surface roadway or that expected from the detailed map information. Again this threshold value may be based on the composition of the surface of the roadway (blacktop, cement, brick, etc.). For example, if the average intensity of the roadway is at least a threshold value or number of standard deviations greater than the expected intensity of the roadway (or that type of roadway), this information may be indicate that the roadway has a covering of snow or ice.

Figure 18:
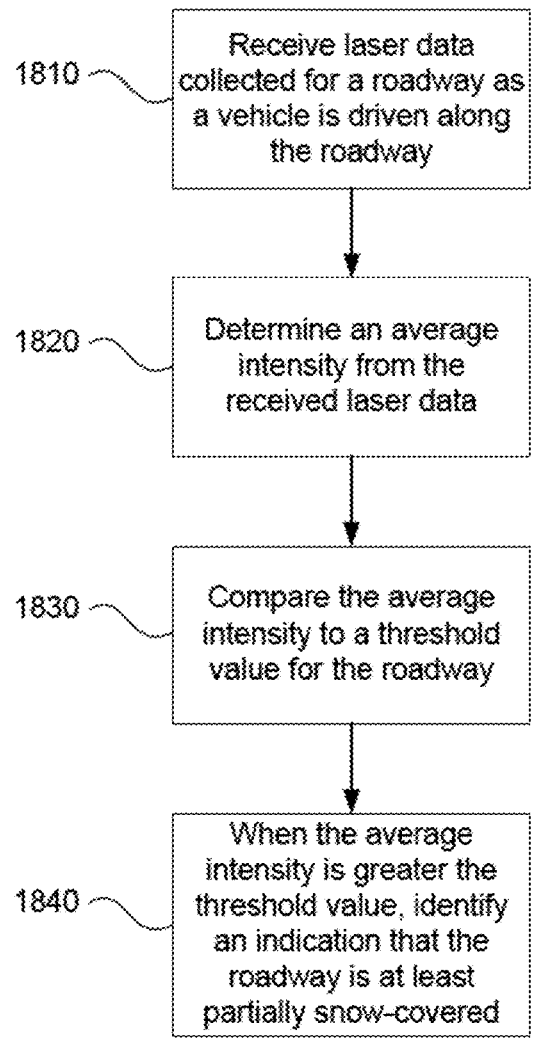
FIG. 18 is a further flow diagram in accordance with an implementation.

Flow diagram 1800 of FIG. 18 is an example of how computer 110 may use the average intensity of the roadway as well as a threshold value to identify an indication that the roadway is at least partially snow covered. In this example, computer 110 receives laser data collected for a roadway as a vehicle is driven along the roadway at block 1810. As noted above, the laser data includes a plurality of laser data points having location and intensity information. At block 1820, computer 110 determines an average intensity from the received laser data. This average intensity is compared to a threshold value for the roadway at block 1830. When the average intensity is greater the threshold value, the computer then identifies an indication that the roadway is at least partially snow covered at block 1840.

In another example, computer 110 may use the average intensity of the world, in other words, areas including as well as outside of the roadway, to identify an indication of snowy conditions. Often, snow can collect beyond the bounds of the roadway before doing so on the roadway itself. For example, snow on the ground outside of the roadway (such as beyond the boundaries of the lanes, shoulders, curbs, etc.) may also be lighter, brighter, and more highly reflective than the roadway, shoulder, curbs, sidewalks, etc. The highly reflective, white snow may cause the laser intensity data collected from these areas to be significantly higher than expected from the detailed map information. Again, if the average intensity of the world outside of the roadway is at least some threshold value or number of standard deviations greater than the expected intensity as defined in the detailed map information, this may indicate that the world has at least some snow covering which is likely to also collect (or has already begun collecting) on the roadway.

Figure 19:
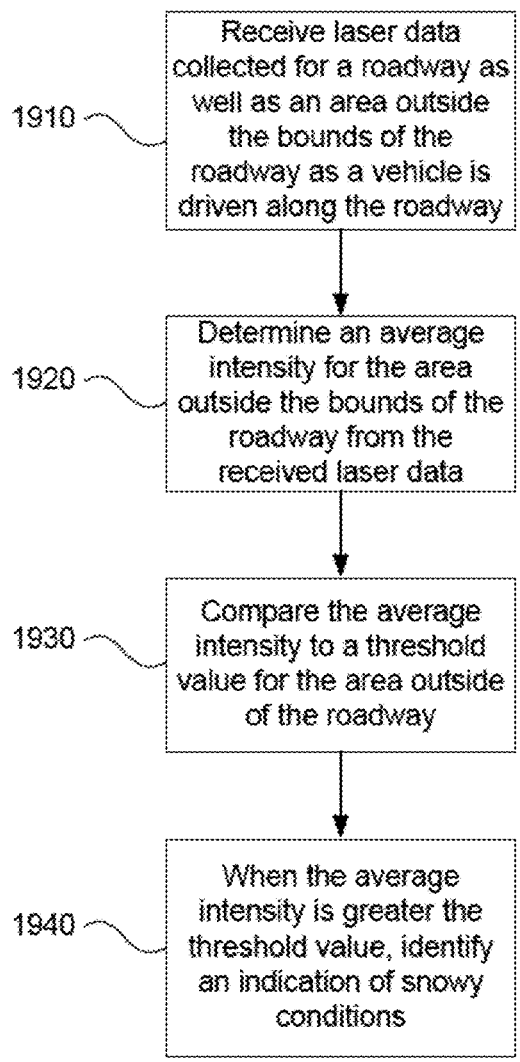
FIG. 19 is a further flow diagram in accordance with an implementation.

Flow diagram 1900 of FIG. 19 is an example of how computer 110 may use the average intensity of the roadway as well as a threshold value to identify an indication that the roadway is wet. In this example, computer 110 receives laser data collected for a roadway as well as an area outside of the bounds of the roadway as a vehicle is driven along the roadway at block 1910. As noted above, the laser data includes a plurality of laser data points having location and intensity information. At block 1920, computer 110 determines an average intensity of an area outside the bounds of the roadway from the received laser data. This average intensity is compared to a threshold value expected from the area (for example, from the detailed map 136) at block 1930. When the average intensity is greater the threshold value, the computer then identifies an indication of snowy conditions at block 1940.

In addition to, or instead of, considering brightness or intensity values, the computer 100 may also examine the elevation or height of the roadway as well as a threshold value to identify indications of road weather conditions. For example, if the elevation of the surface of the roadway is detected to be above that expected from the detailed map 136, this may indicate the accumulation of snow or flood waters on the roadway. In this regard, computer 110 may use data provided or generated by the various vehicle's sensors, including the lasers, radar, sonar, multiple cameras, etc., for an area of the roadway to determine the location of the roadway surface. This information may then be compared to the elevation expected at that particular area of roadway from the detailed map information. If the average height of the roadway is at least some threshold value or number of standard deviations above the expected elevation, this may indicate that the roadway is flooded or has a covering of accumulated snow.

Figure 20:
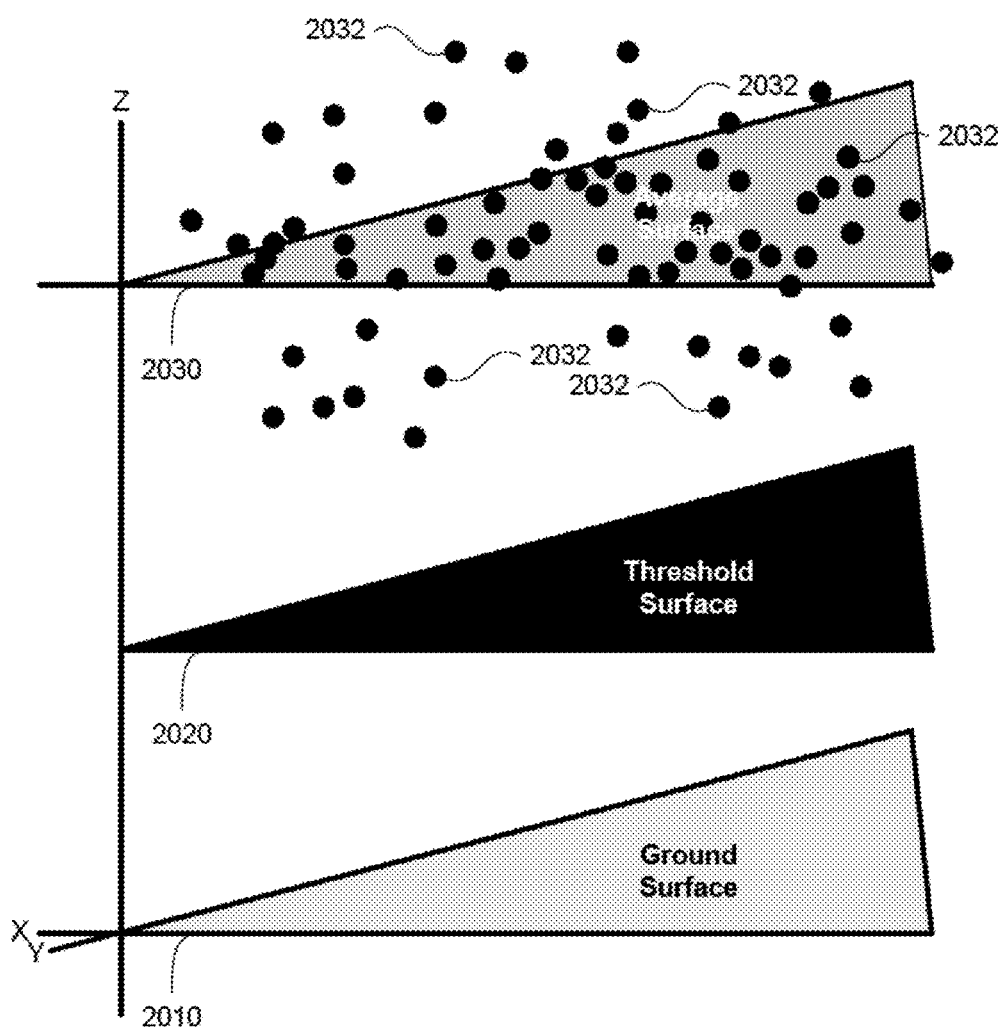
FIG. 20 is a diagram of example data in accordance with an implementation.

FIG. 20 is an example of this difference in elevation. Surface 2010 represents the expected elevation or location of the ground surface for a section of roadway 500. Surface 2020 represents a threshold elevation or location above which would be indicative of a road weather condition. Data points 2032 are a three dimensional projection of the location of the roadway determined from one or more of the laser, sonar, radar, camera data. Surface 2030 represents the average detected surface of the section of roadway 500. In this example, the average detected elevation or location of the road surface of the second of roadway 500 is greater than the threshold value surface 2020. Accordingly, the example of FIG. 20 indicates that the roadway is flooded or has a covering of accumulated snow.

Figure 21:
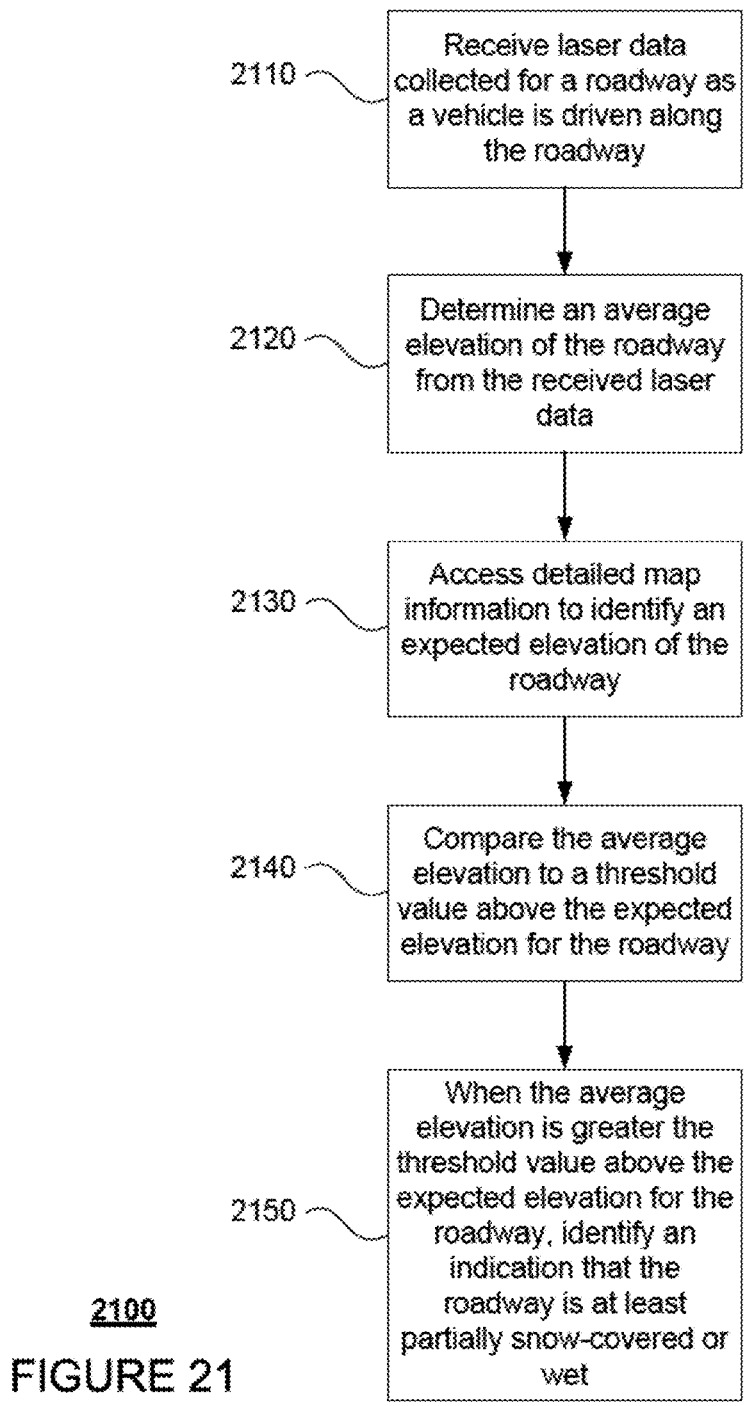
FIG. 21 is a flow diagram in accordance with an implementation.

Flow diagram 2100 of FIG. 21 is an example of how computer 110 may use the average elevation of the roadway as well as a threshold value to identify an indication that the roadway is snow covered or wet. In this example, computer 110 receives laser data collected for a roadway as a vehicle is driven along the roadway at block 2110. As noted above, the laser data includes a plurality of laser data points having location information. At block 2120, computer 110 determines an average elevation of the roadway from the received laser data. At block 2130, the computer access detailed map information to identify an expected elevation of the roadway. This average intensity is compared to a threshold value above the expected elevation of the roadway at block 2140. When the average intensity is below the threshold value, the computer then identifies an indication that the roadway is wet at block 2150.

In addition to snowy and wet road weather conditions, computer 110 may also detect indications of other road weather conditions such as fog. For example, radar sensors of the vehicle may penetrate fog very well, but the laser light may not. If computer 110 observes laser obstacles at a certain distance for some threshold period of time, but no radar targets, the computer 110 may identify an indication that the roadway is foggy.

In another example, in addition to, or instead of, the laser data, the computer 110 may rely on camera information to identify road weather conditions such as wet or snowy road conditions. For example, variations in the brightness, the brightness of the roadway, and the brightness of the world may also be determined from camera images. Similar to the examples described above with regard to the laser intensity data, images captured by cameras 320-21 may be processed to determine if the brightness or reflectivity of the roadway captured by the camera is some threshold value or number of standard deviations greater than that expected from the detailed map information. If so, these camera images may indicate that the roadway is wet, icy, snowy etc. In another example, camera images may be used to determine whether the tires of other vehicles with range of vehicle 101's cameras are kicking up water. If so, these camera images may indicate that the roadway is wet.

In addition to cameras and lasers, information from other sensors, such as the precipitation sensors described above, may also be used by the computer 110 to identify indications of road weather conditions. As noted above, the precipitation sensors may provide computer 110 with current information about precipitation, for example, by identifying amount of reflected light received at the photodetector or some other indicator of the detected amount of precipitation. As with the brightness, elevation, and intensity information, data from one or more precipitation sensors may also be used to identify an indication of a road weather condition such as current precipitation.

The brightness, intensity, elevation, and current precipitation information may also be combined with weather information received from computer 320. The received weather information may be used to identify a road weather condition, for example, if it has just precipitated or is currently precipitating in the area where the vehicle 101 is driving (or will soon be driving), computer 110 may determine that the roadway is likely to be wet, icy, etc.

As noted above, computer 110 may send and receive information with computer 320. In this regard, computer 320 may provide computer 110 with precipitation, cloud, and/or temperature information in the form of reports, radar information, forecasts, etc. This information may be received periodically, for example, every few minutes, hours, or as needed, or may be provided to computer 110 upon request. For example, if computer 110 identifies a road weather condition, such as in the examples described above, the computer 110 may transmit a request including information about the current location of vehicle 101 over a network to computer 320. In response to the request, computer 320 may provide computer 110 with the relevant weather related information for the current location of the vehicle 101. In another example, computer 110 may simply send the aforementioned requests periodically. In yet another example, computer 320 may broadcast information to autonomous vehicles within certain geographic areas as it becomes pertinent. This may be especially useful where the weather related information is providing severe weather warnings, etc.

The various identified indications of road weather conditions may be processed as a set of inputs by computer 110 in order to estimate the driving conditions of the roadway along which the vehicle is traveling. In one example, a Bayesian estimate may be used to determine the current state of the roadway surface. In this regard, the vehicle may determine whether it is currently or has just been precipitating (raining, sleeting, snowing, etc.) and how this weather is affecting the conditions of the roadway (puddles, wet, icy, snow covered, mixed, etc.).

This estimate may then be used by computer 110 to make various driving decisions. For example, if a road weather condition exists, the computer 110 may use the estimate to make more informed determinations for safe maneuvering of vehicle 101. For example, computer 110 may continue to navigate vehicle 110, but also increase the distances between vehicle 101 and other objects on the roadway, slow vehicle 101 down, leave the particular roadway, or move to a particular lane. For example, computer 101 may move to a center lane or side lane that is expected to be less affected by the road weather conditions. In another example, under certain conditions certain driving features may be disabled or altered. For example, if it is raining, the vehicle's lane changing and passing capabilities may be disabled. Similarly, if it is raining or snowing, the braking profiles may be adjusted, such as to apply the brakes periodically to keep them active.

In addition or as an alternative to making a driving decision, the road weather conditions and/or road surface conditions are determined to be extreme or dangerous, the computer 110 may send an alert to the driver. The alert may request the driver take control of the vehicle 101. The alert may be an aural signal, a visual signal, a haptic or tactile and/or any other signal that gets the attention of the driver. The alert may also request that the driver take control of the vehicle. In this example, after alerting the driver, the computer 110 may receive input from the driver. For example, the driver may take control of the vehicle 101 by turning the steering wheel, applying the brake, applying the accelerator, pressing an emergency shut-off, etc. If the computer 110 does not receive input (or sufficient input) from the driver, the computer 110 may navigate the vehicle 101 to the side of the road (i.e., pull the vehicle over), reduce the speed of the vehicle 101, or bring the vehicle 101 to a complete stop.

Figure 22:
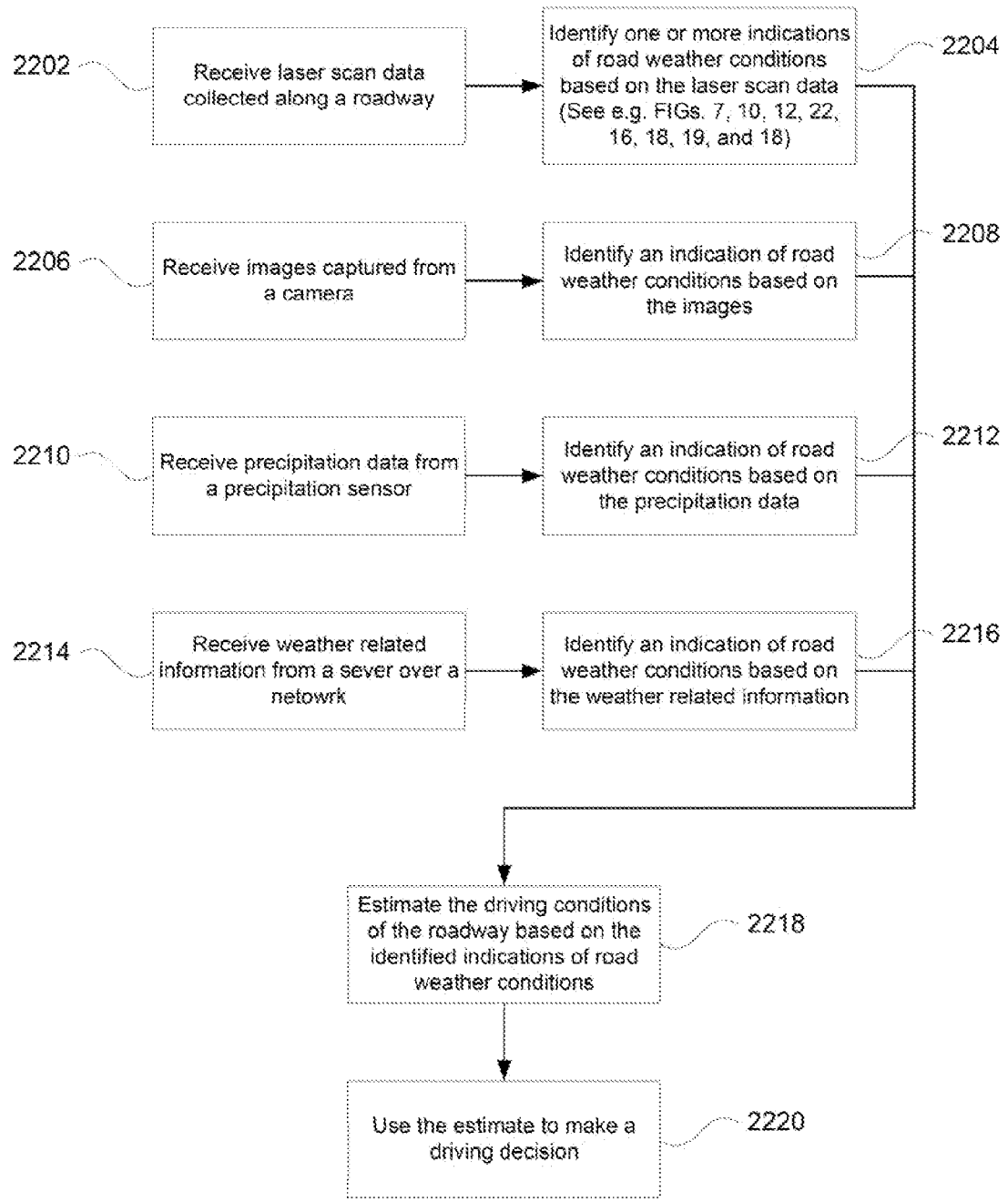
FIG. 22 is another flow diagram in accordance with an implementation.

Flow diagram 2200 of FIG. 22 provides an example of some of the steps performed by computer 110 as described above. It will be understood that the steps discussed herein are merely an example; the steps may occur in a different order, steps may be added, and steps may be omitted. In this example, laser scan data including data points collected along a roadway is received at block 2202. As noted above, the laser scan data may include data points indicating the location and intensity of objects, roadway features, etc. in the laser's surroundings including the roadway, and in some examples, the world beyond the boundaries of the roadway. This information is used to identify one or more road weather conditions at block 2204 (see, for example, the flow diagrams of FIGS. 7, 9, 12, 14, 16, 18, 19, and 21 as well as the various examples above). At block 2206, images captured from a camera are received. Like the laser data, the images may include information about the camera's surroundings including the roadway. The images are then used to identify an indication of road weather conditions at block 2208. Data from a precipitation sensor is received at block 2210, and used to identify an indication of road weather conditions at block 2212. At block 2214, weather related information is received from a server over a network. Again, the weather related information is used to identify an indication of road weather conditions at block 2216. The identified indications are then used to estimate the driving conditions of the roadway at block 2218. The estimate is used to make a driving decision as described above at block 2220.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   receiving laser data collected for a roadway as a vehicle is driven along the roadway, wherein the laser data includes a plurality of laser data points, each data point of the plurality of laser data points having location and intensity information associated therewith;
   determining an average intensity of the plurality laser data points associated with locations within the roadway;
   comparing the average intensity to a threshold value associated with an expected average intensity of the roadway under dry weather conditions;
   when the average intensity is below the threshold value, identifying an indication that the roadway is wet;
   estimating, by a processor, a driving condition of the roadway based on the indication the roadway is wet; and
   using the estimate, by the processor, to make a driving decision for the vehicle.

2. The method of claim 1, wherein the expected average intensity of the roadway under dry weather conditions is based on a composition of the surface of the roadway.

3. The method of claim 1, further comprising:
   determining a distribution of intensity values for the roadway;
   comparing the determined distribution to an expected distribution for dry conditions;
   when the determined distribution is shifted towards a darker end of an intensity scale relative to the expected distribution for dry conditions, identifying a second indication that the roadway is wet; and
   wherein the second indication that the roadway is wet is used by the processor to estimate the driving conditions.

4. The method of claim 1, further comprising:
   detecting a cloud of laser data points of the plurality of laser data points which do not indicate a particular structure located proximate to a rear portion of the vehicle;
   when the cloud is detected, identifying a second indication that the roadway is wet; and
   wherein the second indication that the roadway is wet is used by the processor to estimate the driving conditions.

5. The method of claim 1, further comprising:
   detecting a moving object in the roadway from the plurality of laser data points;
   detecting a cloud of laser data points of the plurality of laser data points which do not indicate a particular structure located proximate to the moving object;
   when the cloud is detected, identifying a second indication that the roadway is wet; and
   wherein the second indication that the roadway is wet is used by the processor to estimate the driving conditions.

6. The method of claim 1,
   further comprising:
   accessing detailed map information for the roadway indicating an expected elevation of the roadway;
   identifying a cloud of laser data points from the received laser data points associated with location data proximate to an expected surface of the roadway;

comparing the laser data points of the cloud to a first threshold value above the expected roadway surface and a second threshold value below the expected roadway surface;

when the laser data points of the cloud include at least one laser data point above the first threshold value and at least one laser data point below the second threshold value, identifying a second indication that the roadway is wet; and wherein the second indication that the roadway is wet is used by the processor to estimate the driving conditions.

7. The method of claim 1, further comprising:
receiving images captured from a camera as the vehicle is driven along the roadway; and
identifying an additional indication that the roadway is wet based on the images,
wherein the additional indication that the roadway is wet is used by the processor to estimate the driving conditions.

8. The method of claim 1, further comprising:
receiving precipitation data from a precipitation sensor associated with the vehicle; and
identifying a second indication that the roadway is wet based on the precipitation data,
wherein the second indication that the roadway is wet is used by the processor to estimate the driving condition.

9. The method of claim 1, wherein estimating the driving condition includes using a Bayesian estimate.

10. The method of claim 1, further comprising:
accessing detailed map information for the roadway indicating an expected elevation of the roadway;
determining an average elevation for a portion of the roadway;
identifying a second indication that the roadway is wet based on whether the average elevation of the portion of the roadway is at least a second threshold value greater than the expected elevation; and
wherein the second indication that the roadway is wet is used by the processor to estimate the driving condition.

11. The method of claim 1, further comprising:
receiving weather information for a current location of the vehicle from a server over a network; and
identifying a second indication that the roadway is wet based on the weather related information,
wherein the second indication that the roadway is wet is used by the processor to estimate the driving condition.

12. A system comprising:
memory storing an expected average intensity of the roadway under dry weather conditions; and
a processor configured to:
receive laser data collected for a roadway as a vehicle is driven along the roadway, wherein the laser data includes a plurality of laser data points, each data point of the plurality of laser data points having location and intensity information associated therewith;
determine an average intensity of the plurality laser data points associated with locations within the roadway;
compare the average intensity to a threshold value associated with the expected average intensity of the roadway under dry weather conditions;
when the average intensity is below the threshold value, identify an indication that the roadway is wet;
estimate a driving condition of the roadway based on the indication the roadway is wet; and
using the estimate to make a driving decision for the vehicle.

13. The system of claim 12, wherein the expected average intensity of the roadway under dry weather conditions is based on a composition of the surface of the roadway.

14. The system of claim 12, wherein the processor is further configured to:
determine a distribution of intensity values for the roadway;
compare the determined distribution to an expected distribution for dry conditions;
when the determined distribution is shifted towards a darker end of an intensity scale relative to the expected distribution for dry conditions, identify a second indication that the roadway is wet; and
wherein the second indication that the roadway is wet is used by the processor to estimate the driving conditions.

15. The system of claim 12, wherein the processor is further configured to:
detect a cloud of laser data points of the plurality of laser data points which do not indicate a particular structure located proximate to a rear portion of the vehicle;
when the cloud is detected, identify a second indication that the roadway is wet; and
wherein the second indication that the roadway is wet is used by the processor to estimate the driving conditions.

16. The system of claim 12, wherein the processor is further configured to:
detect a moving object in the roadway from the plurality of laser data points;
detect a cloud of laser data points of the plurality of laser data points which do not indicate a particular structure located proximate to the moving object;
when the cloud is detected, identifying a second indication that the roadway is wet; and
wherein the second indication that the roadway is wet is used by the processor to estimate the driving conditions.

17. The system of claim 12, wherein the processor is further configured to:
access detailed map information for the roadway indicating an expected elevation of the roadway;
identify a cloud of laser data points from the received laser data points associated with location data proximate to an expected surface of the roadway;
compare the laser data points of the cloud to a first threshold value above the expected roadway surface and a second threshold value below the expected roadway surface;
when the laser data points of the cloud include at least one laser data point above the first threshold value and at least one laser data point below the second threshold value, identify a second indication that the roadway is wet; and
wherein the second indication that the roadway is wet is used by the processor to estimate the driving conditions.

18. The system of claim 12, wherein the processor is further configured to:
receive images captured from a camera as the vehicle is driven along the roadway; and
identify an additional indication that the roadway is wet based on the images,
wherein the additional indication that the roadway is wet is used by the processor to estimate the driving conditions.

19. The system of claim 12, wherein the processor is further configured to:
receive precipitation data from a precipitation sensor associated with the vehicle; and
identify a second indication that the roadway is wet based on the precipitation data, wherein the second indication that the roadway is wet is used by the processor to estimate the driving condition.

20. The system of claim 12, wherein when estimating the driving condition the processor is configured to use a Bayesian estimate.

21. The system of claim 12, wherein the processor is further configured to:
   access detailed map information for the roadway indicating an expected elevation of the roadway;
   determine an average elevation for a portion of the roadway;
   identify a second indication that the roadway is wet based on whether the average elevation of the portion of the roadway is at least a second threshold value greater than the expected elevation; and
   wherein the second indication that the roadway is wet is used by the processor to estimate the driving condition.

22. The system of claim 12, wherein the processor is further configured to:
   receive weather information for a current location of the vehicle from a server over a network; and
   identify a second indication that the roadway is wet based on the weather related information,
   wherein the second indication that the roadway is wet is used by the processor to estimate the driving condition.

* * * * *